US009754409B2

United States Patent
Soulard et al.

(10) Patent No.: US 9,754,409 B2
(45) Date of Patent: Sep. 5, 2017

(54) METHOD, APPARATUS AND SYSTEM FOR TESSELLATING A PARAMETRIC PATCH

(71) Applicant: CANON KABUSHIKI KAISHA, Tokyo (JP)

(72) Inventors: Hervé Soulard, Beacon Hill (AU); Jun Liu, Dundas (AU); Andrew R Coker, Macquarie Park (AU); Abhijit Mandal, Krishnagar (IN)

(73) Assignee: CANON KABUSHIKI KAISHA, Tokyo (JP)

( * ) Notice: Subject to any disclaimer, the term of this patent is extended or adjusted under 35 U.S.C. 154(b) by 321 days.

(21) Appl. No.: 14/559,409

(22) Filed: Dec. 3, 2014

(65) Prior Publication Data

US 2015/0154797 A1    Jun. 4, 2015

(30) Foreign Application Priority Data

Dec. 4, 2013   (AU) ................................. 2013267004

(51) Int. Cl.
G06T 17/20         (2006.01)
(52) U.S. Cl.
CPC .................................. G06T 17/205 (2013.01)
(58) Field of Classification Search
CPC .................................................. G06T 17/205
See application file for complete search history.

(56) References Cited

U.S. PATENT DOCUMENTS

| 5,278,948 | A | * | 1/1994 | Luken, Jr. | G06T 17/20 345/423 |
|---|---|---|---|---|---|
| 5,283,860 | A | * | 2/1994 | Einkauf | G06T 17/20 345/423 |
| 5,353,389 | A | * | 10/1994 | Fiasconaro | G06T 17/00 345/419 |
| 5,377,320 | A | | 12/1994 | Abi-Ezzi et al. | |
| 5,428,718 | A | * | 6/1995 | Peterson | G06T 17/20 345/423 |

(Continued)

OTHER PUBLICATIONS

Schwarz, et al., "Fast GPU-based Adaptive Tessellation with CUDA," In Computer Graphics Forum, vol. 28, No. 2, pp. 365-374, Blackwell Publishing Ltd, 2009.

(Continued)

*Primary Examiner* — Jacinta M Crawford
*Assistant Examiner* — Jitesh Patel
(74) *Attorney, Agent, or Firm* — Canon U.S.A., Inc. IP Division

(57) ABSTRACT

A method of tessellating a parametric patch (610) of an object is disclosed. A boundary curve associated with the parametric patch (610) is vectorized according to a predetermined flatness tolerance. A tessellation point associated with a first parametric value inside the parametric patch (610) is determined based on geometry of the parametric patch (610) and a tessellation step. A curve associated with the first parametric value is determined based on the geometry of the parametric patch (610) and the tessellation step. A color split point on the vectorized boundary curve is determined. The color split point is determined based on the vectorized boundary curve and the determined curve associated with the first parametric value. The parametric patch (610) is tessellated by joining the color split point and the tessellation point.

19 Claims, 16 Drawing Sheets

(56) References Cited

U.S. PATENT DOCUMENTS

| | | | | |
|---|---|---|---|---|
| 5,995,109 | A * | 11/1999 | Goel | G06T 17/20 345/419 |
| 6,476,809 | B1 * | 11/2002 | Browne | G06T 11/40 345/423 |
| 6,563,501 | B2 * | 5/2003 | Sfarti | G06T 17/30 345/423 |
| 6,624,811 | B1 * | 9/2003 | Moreton | G06T 17/20 345/423 |
| 6,707,452 | B1 * | 3/2004 | Veach | G06T 17/205 345/421 |
| 6,940,505 | B1 * | 9/2005 | Savine | G06T 17/20 345/419 |
| 7,006,088 | B1 * | 2/2006 | Guskov | G06T 17/205 345/420 |
| 7,023,435 | B1 * | 4/2006 | Litke | G06T 17/205 345/420 |
| 7,948,489 | B1 | 5/2011 | Barnes et al. | |
| 8,120,607 | B1 * | 2/2012 | Legakis | G06T 17/20 345/423 |
| 8,269,770 | B1 * | 9/2012 | Carr | G06T 17/20 345/419 |
| 8,471,852 | B1 * | 6/2013 | Bunnell | G06T 17/20 345/423 |
| 8,605,085 | B1 * | 12/2013 | Moreton | G06T 17/20 345/419 |
| 9,147,288 | B1 * | 9/2015 | Johnston | G06T 19/00 |
| 2002/0145606 | A1 | 10/2002 | Levanon et al. | |
| 2004/0113909 | A1 | 6/2004 | Fenney et al. | |
| 2004/0227755 | A1 * | 11/2004 | Sfarti | G06T 17/30 345/423 |
| 2004/0257363 | A1 | 12/2004 | Veach | |
| 2008/0043023 | A1 * | 2/2008 | Loop | G06T 17/20 345/441 |
| 2009/0237400 | A1 * | 9/2009 | Patel | G06T 17/20 345/423 |
| 2011/0080405 | A1 * | 4/2011 | Moreton | G06T 17/20 345/423 |
| 2011/0169828 | A1 * | 7/2011 | Pedersen | G06T 17/20 345/423 |
| 2013/0162651 | A1 * | 6/2013 | Martin | G06T 17/20 345/441 |
| 2013/0293541 | A1 * | 11/2013 | Maisonneuve | G06F 17/5086 345/420 |
| 2014/0184598 | A1 * | 7/2014 | Quilot | G06T 17/20 345/423 |

OTHER PUBLICATIONS

Fisher, et al., "DiagSplit: parallel, crack-free, adaptive tessellation for micropolygon rendering," In ACM Transactions on Graphics (TOG), vol. 28, No. 5, pp. 150, ACM, 2009.

Fung, "Towards adaptive rendering of smooth primitives on GPUs," PhD diss., University of British Columbia, Oct. 2005.

Lai, et al., "Inscribed Approximation based Adaptive Tessellation of Catmull-Clark Subdivision Surfaces," International Journal of CAD/CAM 6, No. 1, 2009.

Loop, "Hardware Subdivision and Tessellation of Catmull-Clark Surfaces," Tech. Rep. MSR-TR-2010-163, Microsoft Research, May 2010.

Loop, et al., "Real-time patch-based sort-middle rendering on massively parallel hardware," Tech. Rep. MSR-TR-2009-83, Microsoft Research, May 2009.

Rockwood, et al., "Real-time rendering of trimmed surfaces," In ACM SIGGRAPH Computer Graphics, vol. 23, No. 3, pp. 107-116. ACM, Jul. 1989.

Sfarti, et al., "New 3D graphics rendering engine architecture for direct tessellation of spline surfaces," In International Conference on Computational Science, pp. 224-231. Springer Berlin Heidelberg, 2005.

Dyken, et al., "Semi-Uniform Adaptive Patch Tessellation," In Computer Graphics Forum, vol. 28, No. 8, pp. 2255-2263. Blackwell Publishing Ltd, 2009.

Filip et al., "Surface algorithms using bounds on derivatives." Computer Aided Geometric Design 3 (1986), pp. 295-311.

* cited by examiner

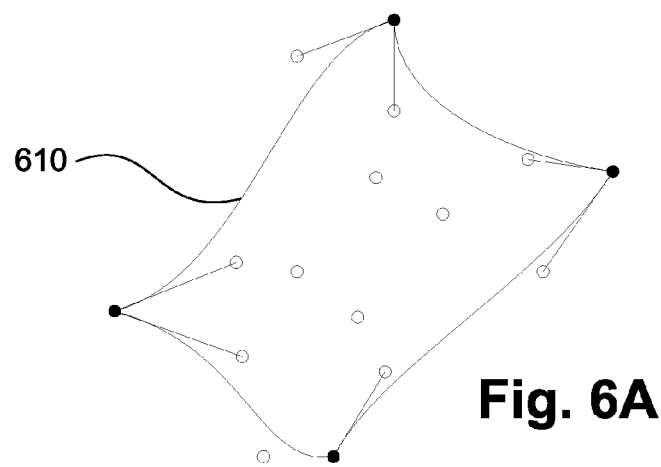
Fig. 6A
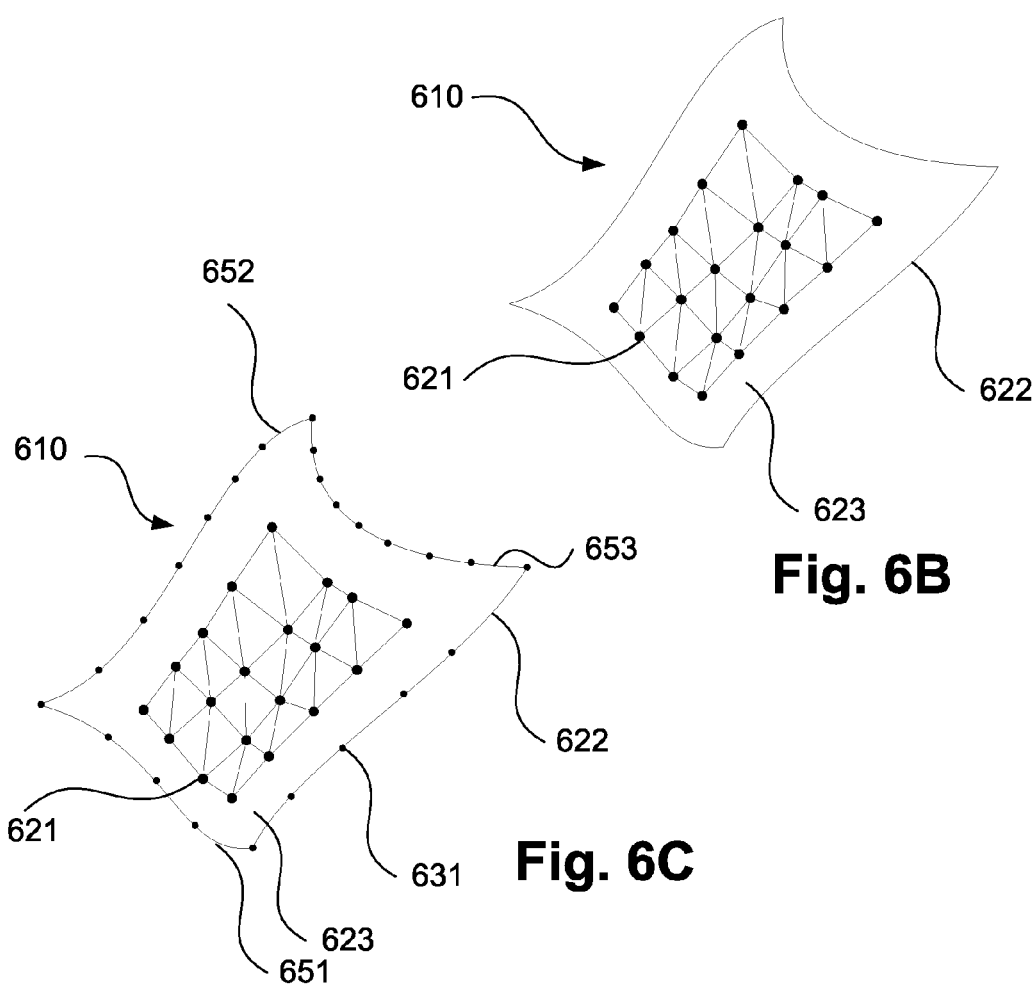
Fig. 6B
Fig. 6C

METHOD, APPARATUS AND SYSTEM FOR TESSELLATING A PARAMETRIC PATCH

REFERENCE TO RELATED PATENT APPLICATION(S)

This application claims the benefit under 35 U.S.C. §119 of the filing date of Australian Patent Application No. 2013267004, filed 4 Dec. 2013, hereby incorporated by reference in its entirety as if fully set forth herein.

TECHNICAL FIELD

The present invention relates generally to computer graphics and, in particular, to the tessellation of shading objects described by parametric patches. The present invention also relates to a method and apparatus for tessellating a parametric patch of an object, and to a computer program product including a computer readable medium having recorded thereon a computer program for tessellating a parametric patch of an object.

BACKGROUND

Many methods have been developed in two-dimensional (2D) computer graphics in recent times to improve the quality of output. Various methods of rendering of graphical objects that have a solid color or a linear or radial blend between two colors are known. More recently methods such as Gouraud shaded triangle meshes and blends across parametric patches have been adapted from three-dimensional (3D) computer graphics to 2D computer graphics in order to greatly increase the shapes and styles of blends that may be produced.

A geometric object referred to herein as a "parametric patch" may be defined by four curves (e.g., Bézier curves) in x, y coordinate space. The four curves that typically maps a unit square in parametric u, v coordinate space. Examples of such parametric patches are Coons and tensor-product patches. A Coons patch may be defined by four connected Bézier Curves and four implicit control points. "Type 6" shading performed in accordance with the Portable Document Format (PDF) ISO32000-1:2008 specification type 6 shading comprises one or more colored Coons patches. A tensor-product patch may be defined by four connected Bézier Curves and by additional control points. Such type 6 shading will be referred to below as "PDF shading type 6".

"Type 7" shading performed in accordance with the PDF ISO32000-1:2008 standard type 7 shading comprises one or more colored tensor-product patches. Such type 7 shading will be referred to below as "PDF shading type 7". The Coons patch determined (PDF Type 6) as part of the PDF shading type 6 is a special case of a tensor-product patch. Coons patches may be converted to tensor-product patches. The PDF shadings are specified in the Portable Document Format (PDF) ISO32000-1:2008.

Each point in a PDF shading type 6 or type 7 patch may be associated with a t-value which is mapped to a color value using a PDF shading color function. The PDF shading color function may be non-linear. In PDF shading type 6 or type 7 shading, the color data of each of the four corners of the parametric patch may be specified by t-values.

Vector graphics on imaging devices, such as display devices or printers, are typically converted to raster graphics data in a process called rasterization. During rasterization, surfaces defined by geometric objects may be subdivided into polygons (e.g. triangles or quadrilaterals) in a process called tessellation. In particular, a surface of an object may be described as a parametric patch, in which a function of two variables (u, v) is used to describe patches of the surface in three dimensional (3D) space: $(x, y, z)=(X(u, v), Y(u, v), Z(u, v))$.

where $X(u, v)$, $Y(u, v)$ and $Z(u, v)$, are functions in the parameters (u, v). Properties of the surface, such as textures or colours, may be applied to the surface in terms of either calculated positions, or equivalently, in terms of the parameters (u, v). As described above, examples of parametric patches include Coons patches, Bezier patches, and Tensor product patches. The boundary of such patches is defined as a set of four Bezier curves.

To render the surface, the surface is typically subdivided into triangles, over which the properties of the patch may be represented. The properties of the patch are represented using linear functions to provide a good approximation of the patch, defined by a tolerance. The tolerance is a quality parameter that is usually provided in a print job definition. This part of the rendering process is referred to as "tessellation". Tessellation is performed because direct calculation of pixel values is computationally expensive.

Two or more patches may be joined together to form a mesh of patches. When patches are independently tessellated, the tessellated patches often do not match at the boundaries of the patches. For example, patches with a common boundary may not have the same number of triangle vertex points along the boundary curve, and the positions of the vertices may not correspond, because of differences in the local geometry on either side of the boundary. Such errors are referred to as crack artefacts, because the errors appear as cracks at the boundary between the patches.

Crack artefacts may be addressed by separately vectorising the boundary curves. The curves may be approximated by linear segments, such that the linear segments match the exact boundary curve to within a flatness tolerance, $\epsilon$. The vertices of the polygon formed by the vectorised boundary curves are then used as vertices of the tessellation for the patch. The vectorising method ensures that the boundary curve is represented by the same set of points in the two patches for which the boundary curve forms the common boundary. However, the vectorising method restricts the points that may be used for performing a tessellation of the patch in the region near the boundary curve, so that it may not be possible to obtain an interior tessellation that fits the flatness tolerance criteria near the boundary curve.

A tighter flatness tolerance than originally defined in the print job definition may be used to address the problem created by restricting the points that may be used for performing a tessellation of the patch in the region near the boundary curve. This however leads to a proliferation of triangles which consequently increases rendering time due to the time to generate the triangles, and the time to render the triangles separately. Furthermore, this still does not guarantee that it is possible to obtain an interior tessellation that fits the flatness tolerance criteria near the boundary curve.

Thus, a need clearly exists for a crack-free tessellation that meets a given flatness tolerance criterion.

SUMMARY

It is an object of the present invention to substantially overcome, or at least ameliorate, one or more disadvantages of existing arrangements.

Disclosed are arrangements for tessellating a parametric patch object by performing an initial vectorisation of a boundary curve to a pre-determined flatness tolerance. Interior points of the patch are then tessellated, and a curve fitting a row of interior tessellation vertices is projected onto the vectorised boundary curve to form a split point. The split point is then used as a vertex of the tessellation, ensuring that a tessellation that meets the flatness tolerance can be found. The split point is selected to be on the vectorised boundary curve, which ensures that the split point does not modify the boundary curve. The adjacent patch may be separately tessellated using only the original vectorisation of the boundary curve, without introducing any cracking artefacts.

According to one aspect of the present disclosure, there is provided a method of tessellating a parametric patch of an object, said method comprising:

vectorising a boundary curve associated with the parametric patch according to a pre-determined flatness tolerance;

determining a tessellation point associated with a first parametric value inside the parametric patch based on geometry of the parametric patch and a tessellation step;

determining a curve associated with the first parametric value based on the geometry of the parametric patch and the tessellation step;

determining a colour split point on the vectorised boundary curve, the colour split point being determined based on the vectorised boundary curve and the determined curve associated with the first parametric value; and tessellating the parametric patch by joining the colour split point and the tessellation point.

According to another aspect of the present disclosure, there is provided a system for tessellating a parametric patch of an object, said system comprising:

a memory for storing data and a computer program;

a processor coupled to the memory for executing the computer program, the computer program comprising instructions for;

vectorising a boundary curve associated with the parametric patch according to a pre-determined flatness tolerance;

determining a tessellation point associated with a first parametric value inside the parametric patch based on geometry of the parametric patch and a tessellation step;

determining a curve associated with the first parametric value based on the geometry of the parametric patch and the tessellation step;

determining a colour split point on the vectorised boundary curve, the colour split point being determined based on the vectorised boundary curve and the determined curve associated with the first parametric value; and tessellating the parametric patch by joining the colour split point and the tessellation point.

According to still another aspect of the present disclosure, there is provided an apparatus for tessellating a parametric patch of an object, said apparatus comprising:

means for vectorising a boundary curve associated with the parametric patch according to a pre-determined flatness tolerance;

means for determining a tessellation point associated with a first parametric value inside the parametric patch based on geometry of the parametric patch and a tessellation step;

means for determining a curve associated with the first parametric value based on the geometry of the parametric patch and the tessellation step;

means for determining a colour split point on the vectorised boundary curve, the colour split point being determined based on the vectorised boundary curve and the determined curve associated with the first parametric value; and means for tessellating the parametric patch by joining the colour split point and the tessellation point.

According to still another aspect of the present disclosure, there is provided a computer readable medium having a computer program stored thereon for tessellating a parametric patch of an object, said program comprising:

code for vectorising a boundary curve associated with the parametric patch according to a pre-determined flatness tolerance;

code for determining a tessellation point associated with a first parametric value inside the parametric patch based on geometry of the parametric patch and a tessellation step;

code for determining a curve associated with the first parametric value based on the geometry of the parametric patch and the tessellation step;

code for determining a colour split point on the vectorised boundary curve, the colour split point being determined based on the vectorised boundary curve and the determined curve associated with the first parametric value; and code for tessellating the parametric patch by joining the colour split point and the tessellation point.

According to still another aspect of the present disclosure, there is provided a method of tessellating a parametric patch of an object, said method comprising:

vectorising a boundary curve associated with the parametric patch according to a pre-determined flatness tolerance;

determining a plurality of tessellation points inside the parametric patch based on geometry of the parametric patch and a tessellation step;

identifying a fold over point on the boundary curve where at least one internal curve of the parametric patch is tangential to the boundary curve, the at least one internal curve being determined using the geometry of the parametric patch;

determining a geometrical split point on the vectorised boundary curve by projecting the identified fold over point onto the vectorised boundary curve; and tessellating the parametric patch by joining the geometrical split point and at least one said tessellation points.

Other aspects of the invention are also disclosed.

BRIEF DESCRIPTION OF THE DRAWINGS

One or more embodiments of the invention will now be described with reference to the following drawings, in which:

FIG. 6A shows an example Bézier parametric patch;

FIG. 6B shows the parametric patch of FIG. 6A comprising tessellated interior points;

FIG. 6C shows the parametric patch of FIG. 6A comprising tessellated interior points and a set of vertices;

DETAILED DESCRIPTION INCLUDING BEST MODE

Figure 1A:
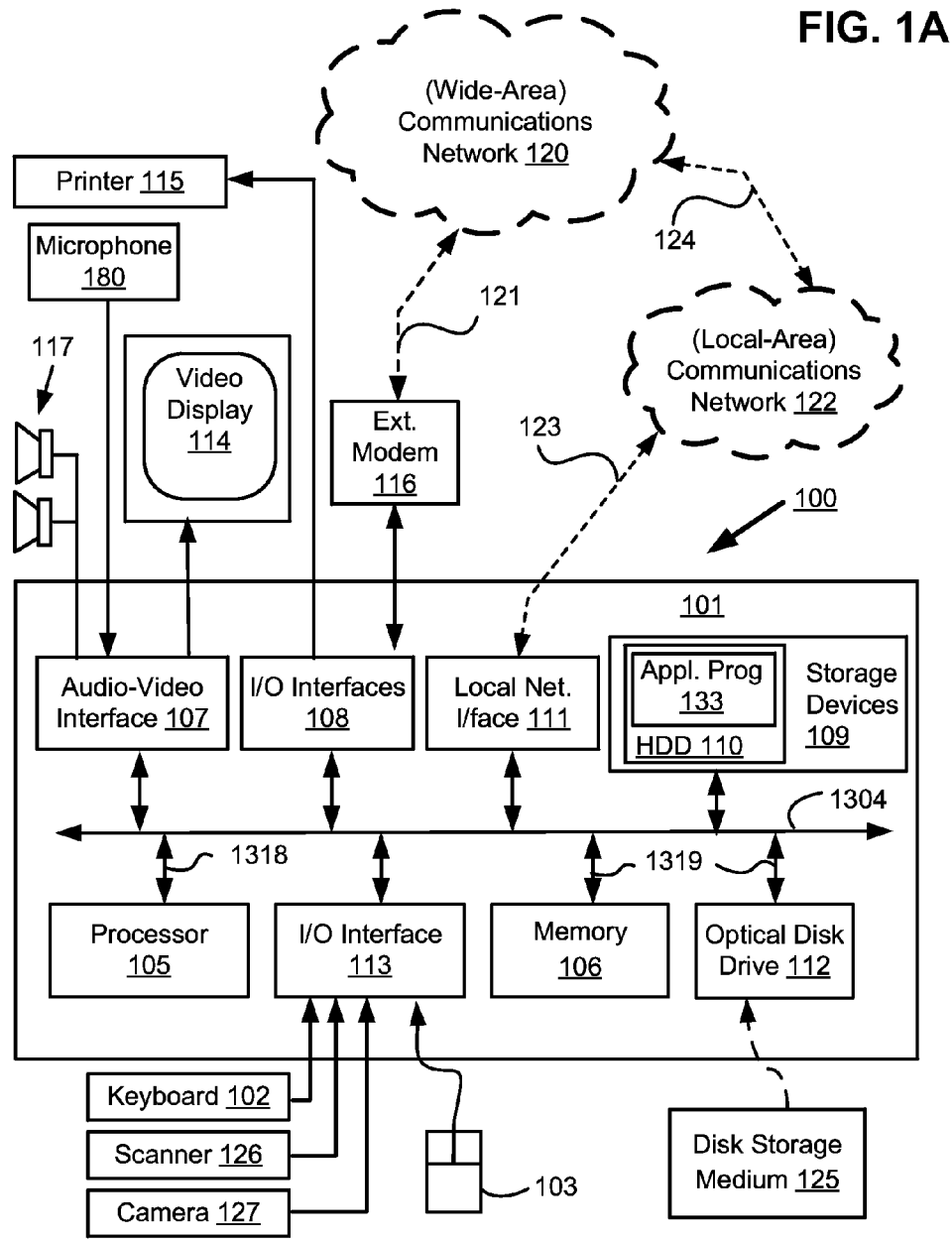
FIGS. 1A and 1B form a schematic block diagram of a general purpose computer system upon which described arrangements may be practised.

Where reference is made in any one or more of the accompanying drawings to steps and/or features, which have the same reference numerals, those steps and/or features have for the purposes of this description the same function(s) or operation(s), unless the contrary intention appears.

Methods of tessellating a parametric patch of an object are described in detail below. The object may consist of multiple parametric patch structures such as PDF type 6 or PDF type 7 data structures. The described methods may be used for obtaining instructions describing the object consisting of multiple parametric patch structures and converting the parametric patch structures to triangular structures with a linear blend function, suitable for processing using a typical rendering module. Colour split points lying on a vectorised boundary, such that the triangles formed meet flatness tolerance requirements on an interior, while still ensuring that the boundaries match.

Figure 1B:
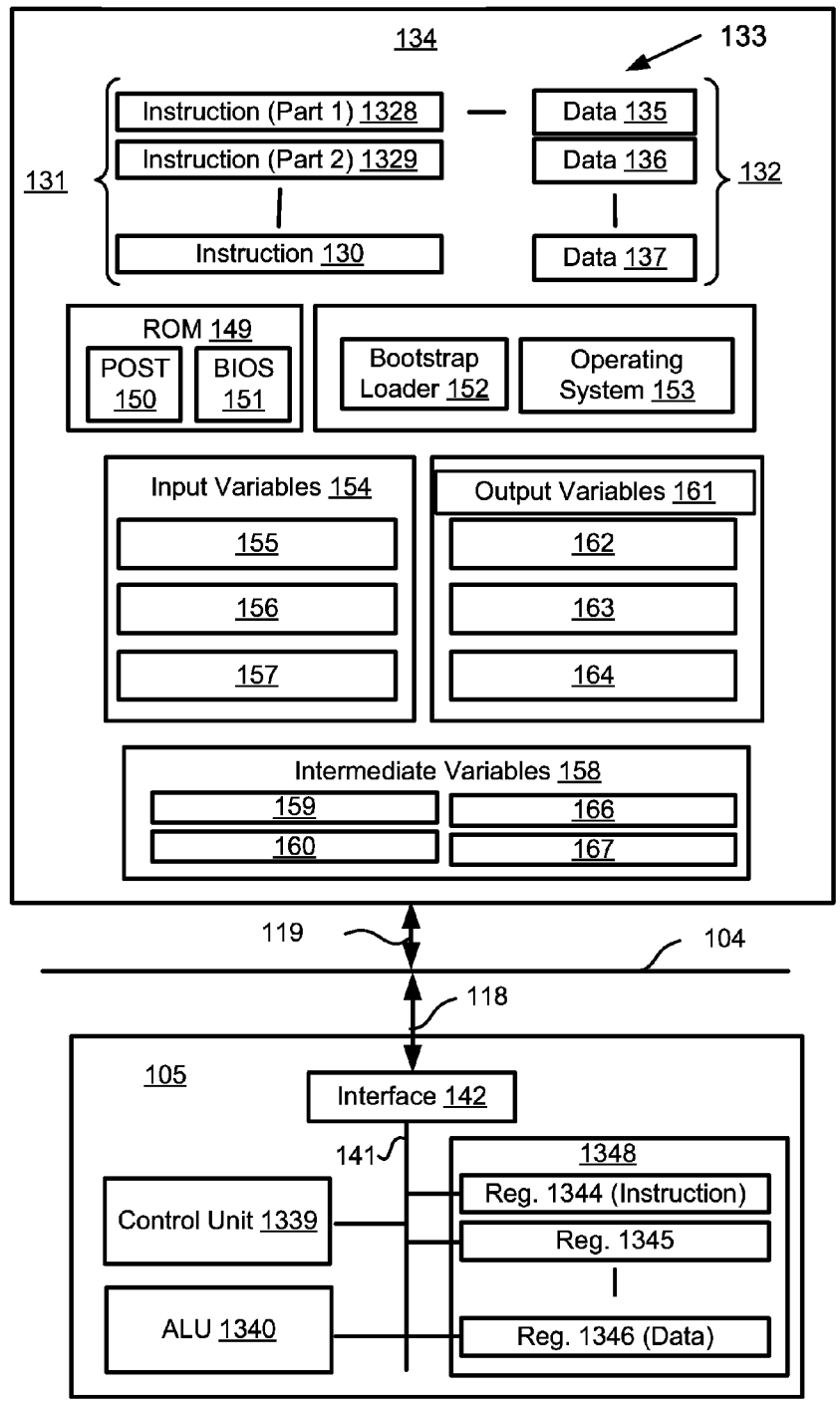

FIGS. 1A and 1B depict a general-purpose computer system 100, upon which the various arrangements described can be practised.

As seen in FIG. 1A, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practised for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or a like computer systems.

Figure 4:
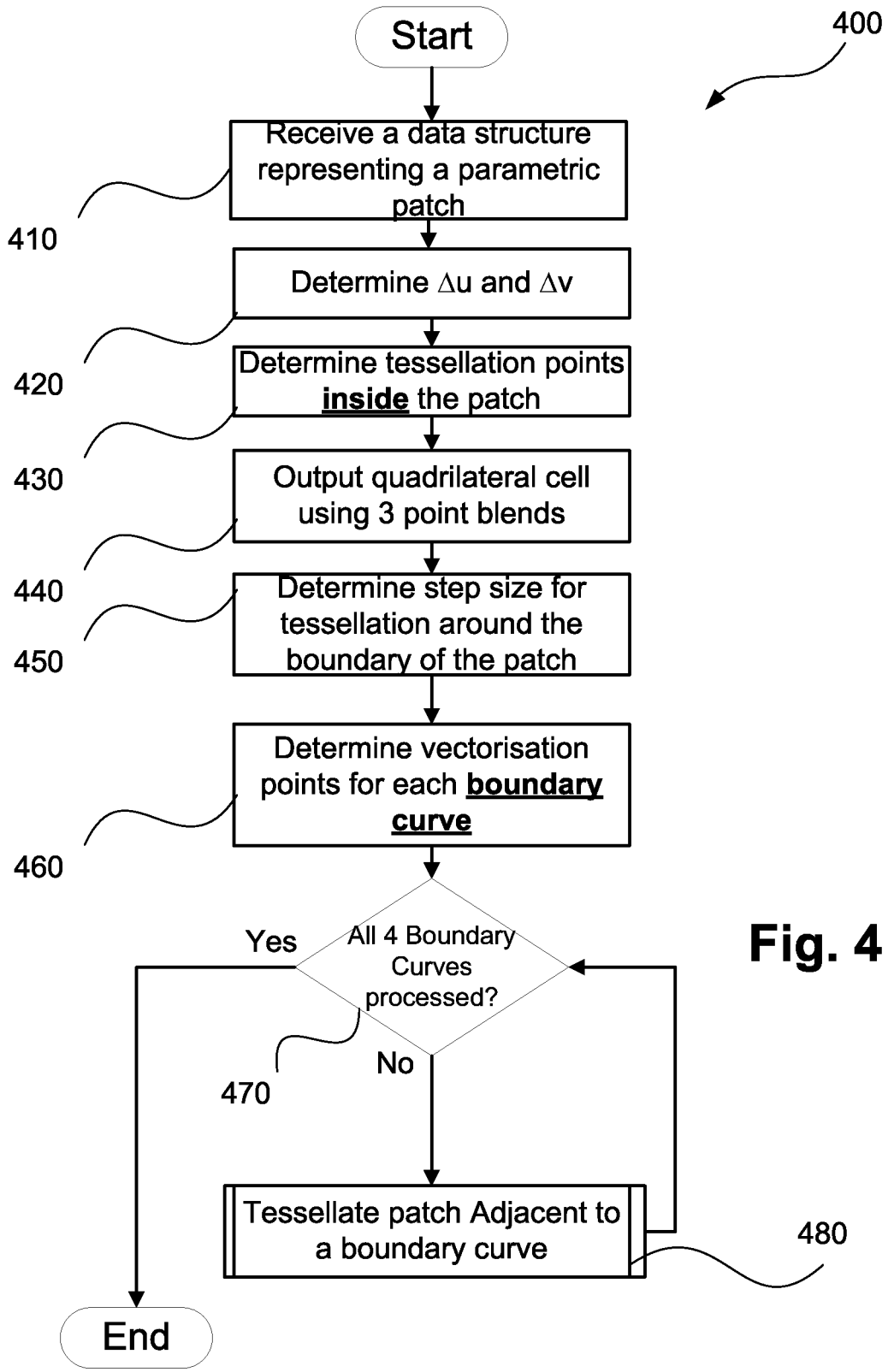
FIG. 4 is a schematic flow diagram showing a method of tessellating a parametric patch.
Figure 5:
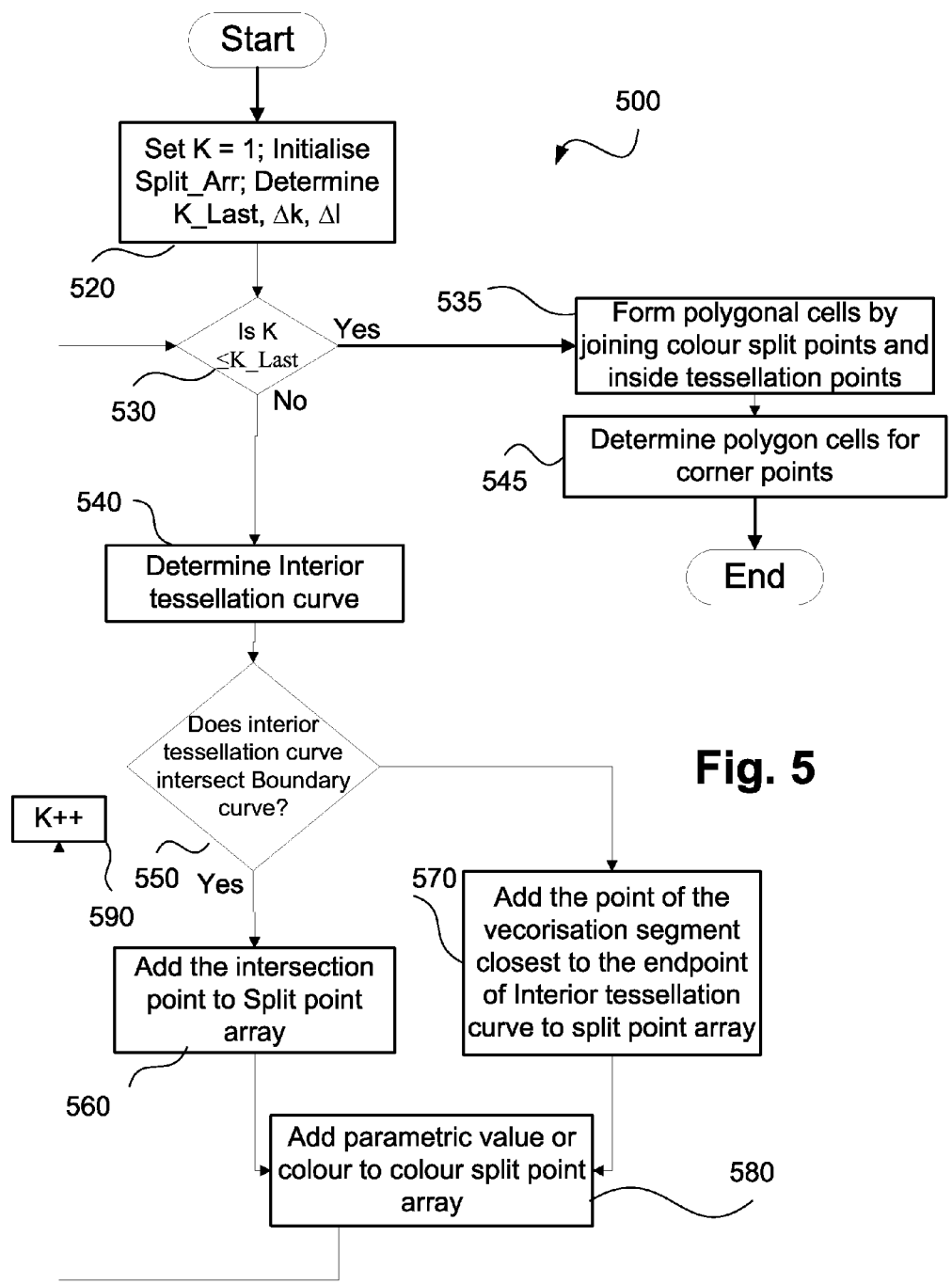
FIG. 5 is a schematic flow diagram a method of tessellating an area of a parametric patch adjacent to a boundary curve of the parametric patch.

The described methods may be implemented using the computer system 100 wherein the processes of FIGS. 4 and 5, to be described, may be implemented as one or more software application programs 133 executable within the computer system 100. In particular, the steps of the described methods are effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the computer system 100 from the computer readable medium, and then executed by the computer system 100. Thus, for example, the software 133 may be stored on an optically readable disk storage medium (e.g., CD-ROM) 125 that is read by the optical disk drive 112. A computer readable medium having such software or computer program recorded on the computer readable medium is a computer program product. The use of the computer program product in the computer system 100 preferably effects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 1105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed arrangements use input variables 154, which are stored in the memory 134 in corresponding memory locations 155, 156, 157. The arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:
- a fetch operation, which fetches or reads an instruction 131 from a memory location 128, 129, 130;
- a decode operation in which the control unit 139 determines which instruction has been fetched; and
- an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Figure 7:
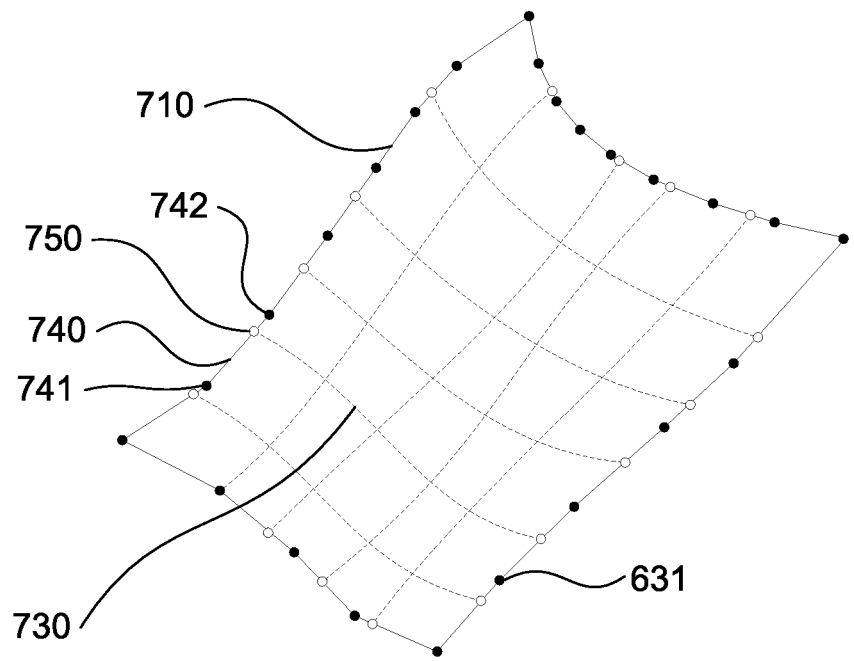
FIG. 7A shows a vectorised boundary curve for the parametric patch of FIG. 6A.
FIG. 7B shows a specific segment of the vectorised boundary curve of FIG. 7A where an interior tessellation curve does not intersect the boundary curve.
FIG. 7C shows a specific segment of the vectorised boundary curve of FIG. 7A where an interior tessellation curve intersects the boundary curve.
FIG. 7D shows the parametric patch of FIG. 6A following tessellation in accordance with the method 400.
Figure 7:
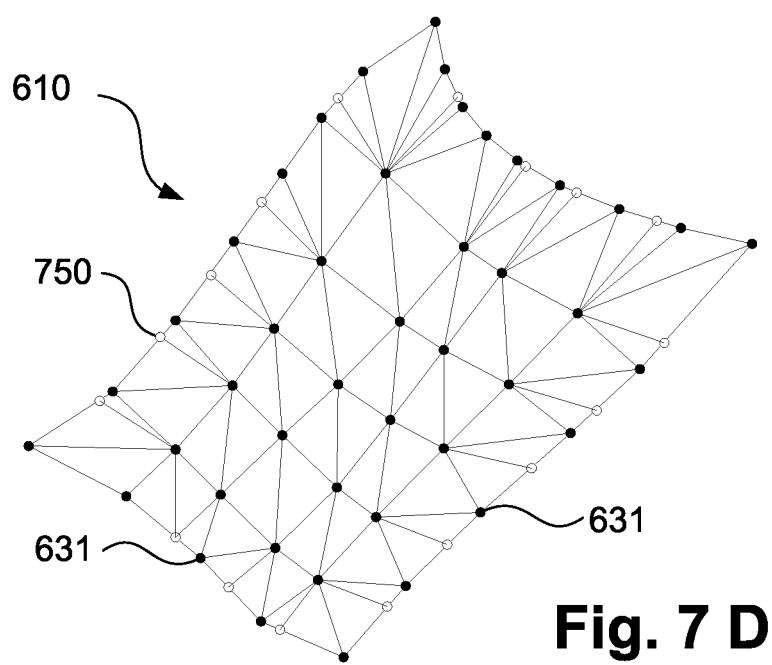

Each step or sub-process in the processes of FIGS. 5 to 7 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 3:
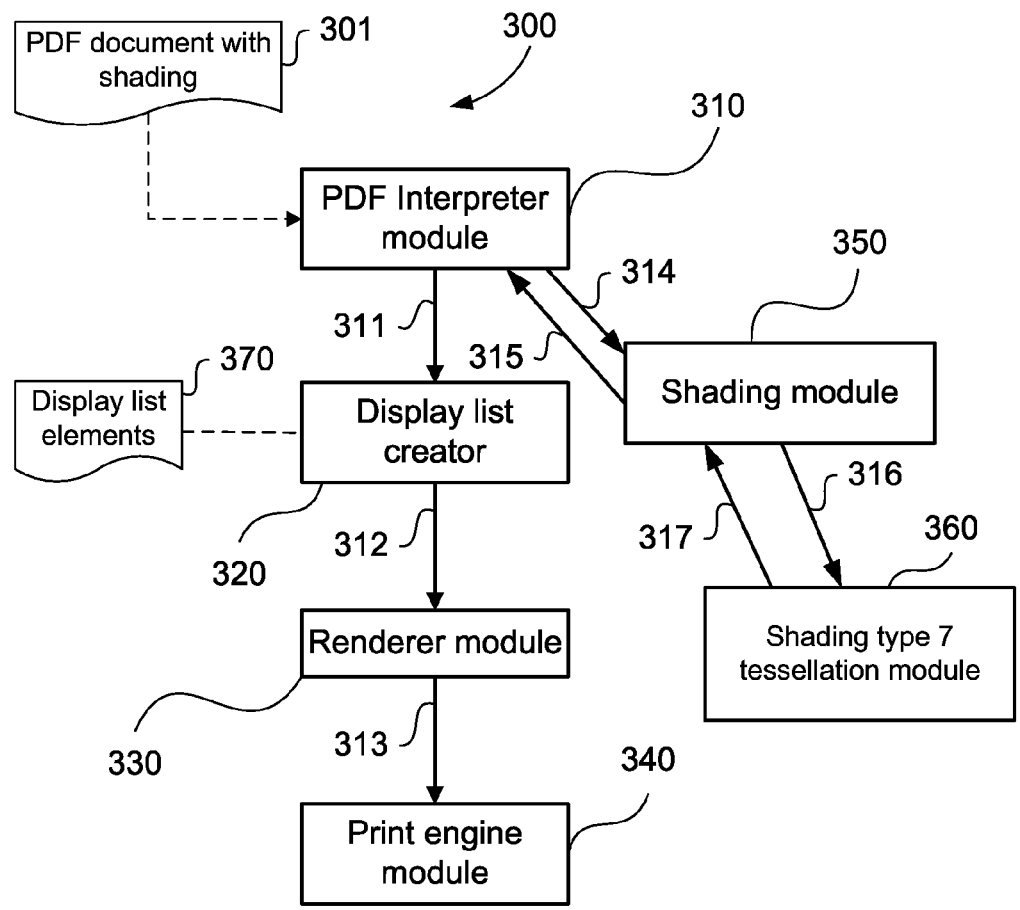
FIG. 3 is a schematic block diagram showing a rendering engine software architecture upon which described arrangements may be practised.

FIG. 3 shows a rendering system software architecture 300 for use in printing. Similar architectures to the architecture 300 may also be used for displaying objects on the display 114, and include very similar components together with systems for animating objects. The software architecture 300 comprises modules 310, 320, 330 340, 350 and 360 which may be implemented as one or more software code modules of the software application program 133 resident within the hard disk drive 110 and being controlled in its execution by the processor 105.

Input data to the architecture 300 is typically in the form of a page description in a page description language such as the Portable Document Format (PDF) or PostScript. Alternatively, the page description may be provided by calls through an application program interface (API). In the example of FIG. 3, for a PDF document 301, the page description of the PDF document 301 is transmitted to a PDF interpreter module 310. The PDF interpreter module 310 may be implemented as one or more software code modules of the software application program 133 resident on the hard disk drive 110 and being controlled in its execution by the processor 105. The PDF interpreter module 310 interprets the PDF instructions, and makes calls over an interface 311 to a display list creator module 320. The display list creator module 320 creates a display list 370 containing display list elements that are suitable for processing by a renderer module 330. The renderer module 330 outputs data in a form suitable for printing, through an interface 313, to a print engine module 340. The print engine module 340 communicates with the printer 115 that performs the printing.

The renderer module 330 typically has a more limited set of available operations that the renderer module 330 can perform than the set of operations defined in standards associated with the page description languages. For example, if an operation is specified in the PDF document 301 that is not able to be performed by the renderer module 330, then the PDF interpreter module 310 modifies the form of the specified operation in order to make suitable calls to the display list generator module 311. Typically, a complex graphical object is replaced by PDF render module 330 with multiple smaller, simpler objects that give the same visual appearance as the complex graphical object.

As seen in FIG. 3, the PDF interpreter module 310 communicates with a shading module 350 over an interface 314. The shading module 350 accepts instructions that cannot be performed by the renderer module 330, over an interface 514. The shading module 350 returns operations that can be performed by the renderer module 330, over an interface 315, back to the PDF interpreter module 310. The shading unit module 350 may further be connected to specialist modules for use with particular types of operations that may be defined in the page description language. For example, module 360 is a shading type 7 tessellation module 360 for obtaining page description instructions that specify a PDF shading type 7 over an interface 316, and returning display list-ready instructions over an interface 317. The shading type 7 tessellation module 360 may be implemented as one or more software code modules of the software application program 133 resident on the hard disk drive 110 and being controlled in its execution by the processor 105. In other arrangements, the shading module 350 may be connected to the display list creator module 320. The described methods may be used for converting data into a linear shading form with linear boundaries.

In other arrangements, there may be more than one instance of each of the modules 310, 320, 330, 340, 350 and 360, operating in parallel. In accordance with the described methods, parametric patches are processed independently, and without reference to neighbouring patches, to eliminate the prospect of data contention.

Figure 2A:
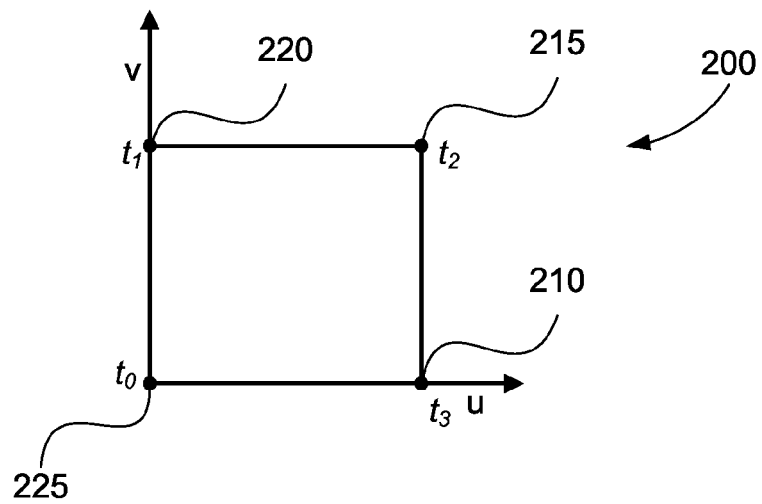
FIG. 2A is a diagram showing the representation of an object according to a PDF Type 7 shading definition data structure.
Figure 2B:
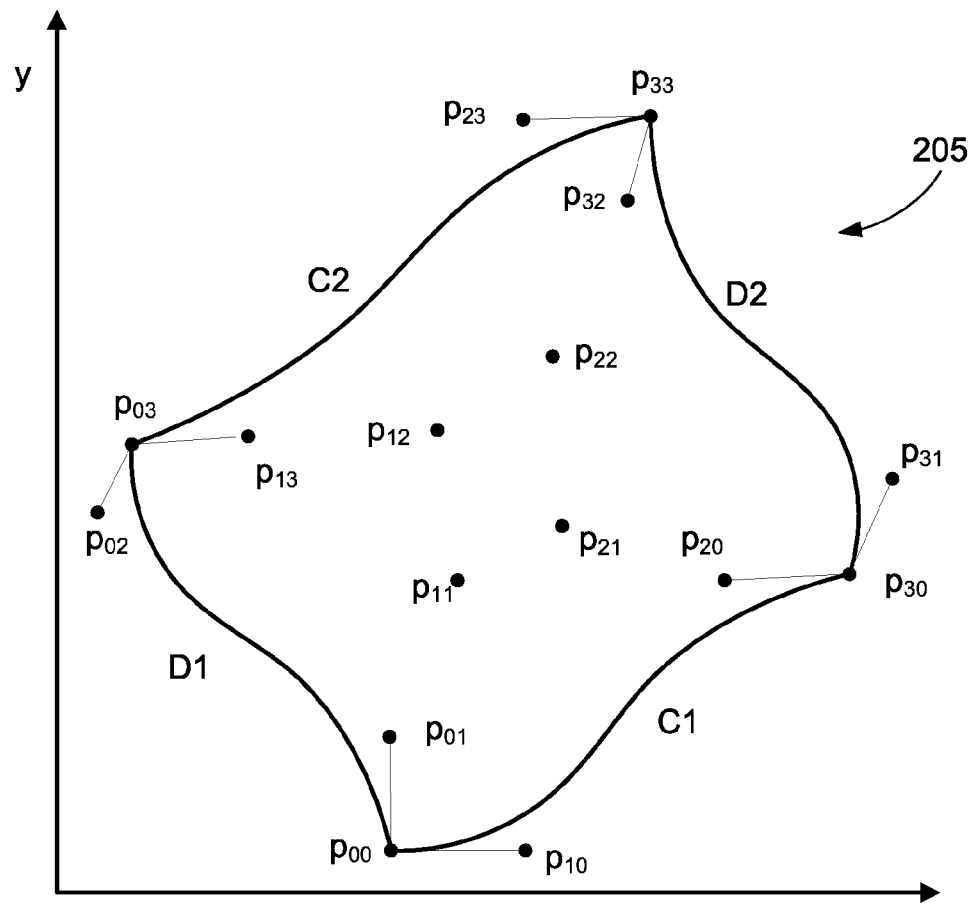
FIG. 2B shows a unit square of FIG. 2A mapped into (x, y) view space.

FIGS. 2A and 2B show an object represented by a PDF Type 7 shading definition data structure. FIG. 2A shows a unit square 200 in (u, v) parameter space. The unit square 200 is mapped into (x, y) view space 205, according to the values of a set of sixteen (16) Bezier control points $p_{ij}$, so that each control point $p_{ij}$ is characterised by x and y components in (x, y) view space 205. The colors of the corners 210, 215, 220 and 225, are also specified, and may be expressed either directly as colours in a colour space, or as parameter values $t_k$, from which a color may later be determined. To obtain intermediate colors in the view space 205, the value of the color at a corresponding position in parameter space is determined. The color in parameter space is obtained from the values of the corners 210, 215, 220 and 225 using bilinear interpolation.

On receiving a PDF type 7 shading definition data structure, the PDF interpreter module 310, under execution of the processor 105, transmits the data structure to a shading module 350, and then to the shading type 7 tessellation module 360. As indicated earlier, there may be several modules, similar to the module 360, working separately on different patches simultaneously.

The renderer module 330 is configured for receiving three (3) point linear blend objects and the shading module 350 is configured to construct data structures for use by the renderer module 330 for three point blends, via the use of the shading type 7 tessellation module 360. More complicated data types such as PDF Type 7 blends are modified into simpler forms by the PDF interpreter modules 310. In accordance with the describe method, PDF type 7 blends are modified into triangular three (3) point blends.

A method 400 of tessellating a parametric patch of an object will now be described with reference to FIGS. 4, 6A, 6B and 6C. The method 400 may be implemented by the shading type 7 tessellation module 360. The method 400 will be described by way of example with reference to a parametric patch 610 as seen in FIG. 6A.

The method 400 starts at receiving step 410, where the shading type 7 tessellation module 360, under execution of the processor 105, receives the data structure representing the parametric patch 610. The parametric patch 610 may be referred to as a "patch".

At determining step 420, suitable values of a tessellation step size $\delta u$, $\delta v$ in each of the u and v directions are determined based on Bezier control points and the flatness tolerance $\epsilon$. The pre-determined flatness tolerance, $\epsilon$, is a constant for a print job corresponding to execution of the method 400. A resulting grid-form tessellation should conform to the flatness tolerance, $\epsilon$. The same value of the flatness tolerance $\epsilon$ is provided to every module in an arrangement where several of the modules 310, 320, 330, 340, 350 and 360 are working separately to tessellate different parametric patches simultaneously. By determining bounds on the second derivatives of a parametric surface which represents the parametric patch 610, the number of segments M, N required in the u and v directions respectively is determined. The tessellation step sizes $\delta u = 1/M$, $\delta v = 1/N$ are determined based on the number of segments M, N.

At determining step 430, the shading type 7 tessellation module 360, under execution of the processor 105, performs a first stage of tessellation on the parametric patch 610, as represented in FIG. 6B. The module 360 is used at step 430 for determining tessellation points inside the patch 610, corresponding to the values of the parameters u, v, at integer multiples of the step sizes $\delta u$, $\delta v$. Each tessellation point is associated with a u, v parametric value inside the parametric patch 610 and is determined at step 430 based on geometry of the parametric patch 610 and based on the tessellation step sizes determined at step 420. As such, the tessellation points are determined based on the pre-determined flatness tolerance $\epsilon$. The tessellation points are determined for a grid form tessellation of an interior part of the parametric patch 610. Points on the boundary curves of the parametric patch 610 are processed separately, as described in detail below.

For integers i,j|0<i<M; 0<j<N, a tessellation point $T_{ij}=(x(i\delta u, j\delta v), y(i\delta u, j\delta v))$ is determined at step 430. Since the value 0 and M for i, and 0 and N for j are not used, the tessellation points on the boundary curves of the parametric patch 610 are not included in the tessellation points inside the parametric patch 610. Each interior tessellation point $T_{ij}$ is associated with a determined colour $C(i\delta u, j\delta v)$, or a determined parameter value $t(i\delta u, j\delta v)$, as per the PDF type 7 shading definition data structure. Quadrilateral cells, defined by region 621 on FIG. 6B, may be split into two triangles by choosing a diagonal. The triangles are output to the shading unit 350 as three point linear blends at outputting step 440. The shading unit 350 may be referred to as the "calling module" at step 440.

Following step 440, an area 623 around boundary curves (e.g. 622) of the parametric patch 610 and an area covered by the three point linear blends output at step 440, which join tessellated points of the region 621, are tessellated.

At steps 450 and 460, a second stage of the tessellation of the parametric patch 610 is performed by vectorising each boundary curve (e.g., 622) associated with the parametric patch 610 based on a curvature of the boundary curve. Vectorisation of each boundary curve is performed to the pre-determined flatness tolerance, $\epsilon$. Vectorisation points are determined for each of the boundary curves of the parametric patch 610, according to the flatness tolerance, c. By determining bounds on the second derivatives of each boundary curve 622 of the parametric patch 610 a tessellation step size along each of the four (4) boundary curves of the patch 610 is determined. In some alternative arrangements, the flatness tolerance $\epsilon$ used at step 650 may be different to the flatness tolerance used at step 620. For example, a smaller flatness tolerance may be used at step 650 for the boundary curves of the parametric patch 610 to determine smoother boundary curves for the parametric patch 610.

At determining step 450, the tessellation step size for tessellation around the boundary of the parametric patch 610 is determined for each boundary curve of the parametric patch 610 by the shading type 7 tessellation module 360 under execution of the processor 105. In particular, for a boundary curve u=0, defined by (x(0, v), y(0, v)), an array of vectorisation points is determined by determining the number of segments, $N_0$, required to ensure that the vectorisation lies within the flatness tolerance $\epsilon$ of the boundary curve u=0, using the bounds on derivatives for the Bezier curve formed by the four control points associated with the boundary curve. The tessellation step size is fixed and determined at step 450 to be $\delta v = 1/N_0$.

Then at vectorising step 460, an array of vectorisation points $A_{u0} = \{P_j = (x(0, j\delta v), y(0, j\delta v))\}, 0 \leq j \leq N_0$ is determined using the shading type 7 tessellation module 360 under execution of the processor 105. The array of vectorisation points determined at step 460 is stored in the memory 106, for example. Each point $P_j$ is associated with a calculated colour $C(0, j\delta v)$, or a calculated parameter value $t(0, j\delta v)$, as per the PDF type 7 shading definition data structure received at step 410.

Step 460 is repeated for the remaining boundary curves of the parametric patch 610, yielding four sets of points (e.g., point 831) and associated colours or parameter values for each of the four boundary curves of the parametric patch 610, in accordance with Equations (1) to (4) or in accordance with Equations (5) to (8), as follows:

$$A_{u0} = \{P_j = (x(0, j\delta v), y(0, j\delta v))\}; C(0, j\delta v); 0 \leq j \leq N_0 \quad (1)$$

$$A_{u1} = \{P_j = (x(1, j\delta v), y(1, j\delta v))\}; C(1, j\delta v); 0 \leq j \leq N_1 \quad (2)$$

$$A_{v0} = \{P_i = (x(i\delta u, 0), y(i\delta u, 0))\}; C(i\delta u, 0); 0 \leq i \leq M_0 \quad (3)$$

$$A_{v0} = \{P_i = (x(i\delta u, 1), y(i\delta u, 1))\}; C(i\delta u, 1); 0 \leq i \leq M_1 \quad (4)$$

or $$A_{u0} = \{P_j = (x(0, j\delta v), y(0, j\delta v))\}; t(0, j\delta v); 0 \leq j \leq N_0 \quad (5)$$

$$A_{u1} = \{P_j = (x(1, j\delta v), y(1, j\delta v))\}; t(1, j\delta v); 0 \leq j \leq N_1 \quad (6)$$

$$A_{v0} = \{P_i = (x(i\delta u, 0), y(i\delta u, 0))\}; t(i\delta u, 0); 0 \leq i \leq M_0 \quad (7)$$

$$A_{v0} = \{P_i = (x(i\delta u, 1), y(i\delta u, 1))\}; t(i\delta u, 1); 0 \leq i \leq M_1 \quad (8)$$

where $N_1$, $M_0$ and $M_1$ represent the numbers of segments determined for the remaining boundary curves 651, 652 and 653 as seen in FIG. 6C. Because the calculations of $N_0$, $N_1$, $M_0$ and $M_1$ involve only the four control points associated with the boundary curve for each side of the parametric patch 610, the calculations of $N_0$, $N_1$, $M_0$ and $M_1$ are the same for adjacent patches for each side of the parametric patch 610, thus preventing crack artefacts. The values of $N_0$, $N_1$, $M_0$ and $M_1$ will not necessarily be the same as the M and N values determined for the interior points of the parametric patch 610, as described above. Therefore, if triangles were formed by simply joining points of the vectorised boundary curves and the closest interior points (either in xy space or in uv parametric space) the resulting tessellation may not meet the flatness tolerance criteria. Following step 460, as seen in FIG. 6C, the parametric patch 610 comprises the tessellated interior points of the region 621 and a set of vertices $A_{u0}$, $A_{u1}$, $A_{v0}$, or $A_{v1}$, (e.g., 631) lying on each of the boundary curves (e.g., boundary curve 622).

The Bézier control points for the side of the boundary curve shared across two adjacent parametric patches are the same. Therefore, the method 400 may be performed independently and in parallel for the two parametric patches. A boundary curve shared by two parametric patches is vectorised twice (i.e., once for each parametric patch). However, both vectorisations are the same because the same method and flatness tolerance is used by both parametric patches.

The method 400 of FIG. 4 then flows from step 460 to steps 470 and 480 in which the area 623 adjacent to the boundary of the parametric patch 610 (i.e., the area 623 between the interior points $T_{ij}$ 621 and the vectorised boundary curves $A_{u0}$, $A_{u1}$, $A_{v0}$, or $A_{v1}$, 631) is tessellated.

At step 470, the state of each of the boundary curves of the parametric patch 610 is tested using the processor 105, and if the area between the interior points 621 and the boundary curve points 631 of the parametric patch 610 have not been tessellated, then the method 400 proceeds to tessellation step 480. Otherwise, the method 400 concludes. A method 500 of tessellating the area 623 adjacent to the boundary of the parametric patch 610, as executed at step 480, will now be described with reference to FIG. 5 and FIGS. 7A, 7B, 7C and 7D.

FIG. 7A shows a vectorised boundary curve 710 as determined at step 460 of the method 400 for the example parametric patch 610. The boundary curve partially defines the parametric patch 610. The vectorised boundary curve 710 comprises vertices (e.g., vertice 631) shown as black dots, and colour split points (e.g., colour split point 750) shown as white dots. The derivation of the colour split points is performed in accordance with the method 500 as described below.

The method 500 may be implemented by the shading type 7 tessellation module 360. As described above, the shading type 7 tessellation module 360 may be implemented as one or more software code modules of the software application program 133. The method 500 will be described by way of example with reference to the example parametric patch 610 and corresponding vectorised boundary curve 710 determined for the parametric patch 610.

The method 500 begins at an initialisation step 520, where a portion of memory 106 is allocated for an array $A_{split}$ that is configured to store colour split points for the boundary curve 710. A loop variable K is initialised to K=1, and a loop limit $K_{last}$ and step sizes $\Delta k$, $\Delta l$ are determined as follows:

For the boundary curves u=0 and v=1, $K_{last}=N$ $\Delta k=\delta v$ $\Delta l=\delta u$ and for boundary curves v=0 and v=1

$K_{last}=M$ $\Delta k=\delta u$ $\Delta l=\delta v$

Then depending on a condition determined at decision 530, a loop through steps 530, 540, 550, 560, 570, 580 and 590 is performed $K_{last}$ times. At decision step 530, if the loop variable K is less than or equal to $K_{last}$, then the method 500 proceeds to step 540. Otherwise, the method 500 proceeds to step 535.

At determining step 540, a curve associated with a parametric value is determined based on the geometry of the parametric patch 610 and the tessellation step sizes determined at step 520. The curve determined at step 540 is an inside curve 730 for the current value of the loop variable K, as seen in FIG. 7A. The inside curve 730 is referred to below as an "interior tessellation curve". The interior tessellation curve 730 determined at step 540 is the curve corresponding to constant K for a current iteration of the loop 530, 540, 550, 560, 570, 580 and 590. Thus, for boundary curve u=0, the interior tessellation curve corresponding to the integer K is the curve v=K$\Delta$k, and so forth.

For a Bezier patch with control points the Bezier curve 730 at point v=K$\Delta$k, as seen in FIG. 7A, is determined in accordance with Equation (9), as follows:

$$R_{v=K\Delta k}(u) = \sum_{i,j=0}^{3} B_{i,3}(u)B_{j,3}(K\Delta k)p_{ij} \quad (9)$$

where the $B_{i,j}$ are the Bernstein polynomials of order three (3). The coefficients (or control points, $B_{j,3}(K\Delta k)p_{ij}$) of the parametric curve $R_{v-K\Delta k}(u)$ at point v=K$\Delta$k are shown in Equation (9). The coefficients (or control points, $B_{j,3}(K\Delta k)p_{ij}$) of the parametric curve $R_{v=K\Delta k}(u)$ at point v=K$\Delta$k are used to determine the intersection point with the vectorised boundary curves corresponding to the start and end of the Bezier curve $R_{v=K\Delta k}(u)$ which in the described examples are $A_{u0}$, $A_{u1}$.

The portion of Equation (9)

$$\left( i.e., \sum_{i,j=0}^{3} B_{i,3}(u)B_{j,3}(K\Delta k)p_{ij} \right)$$

describing interior tessellation curve $R_{v=K\Delta k}(u)$ comprises x and y components due to the fact that represents a point in (x, y) view space 205.

Figure 7B:
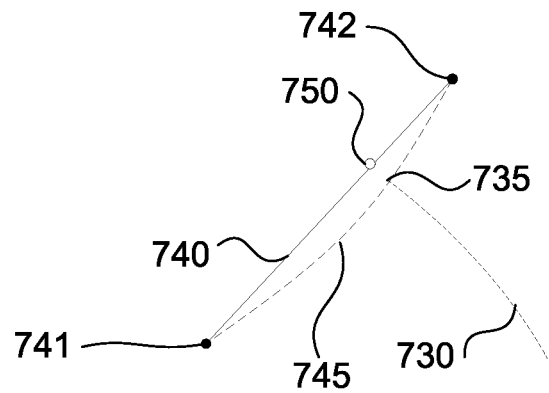

FIG. 7B shows a specific segment 740 of the vectorised boundary curve 710, associated with the endpoint of the interior tessellation curve 730. The segment 740 is determined by determining the two vertices 741 and 742 of the vectorised boundary curve 710 which contains the parameter value associated with the interior tessellation curve 730. For the u=0 boundary, the segment 740 is the segment containing the v=K$\Delta$k value.

Figure 7C:
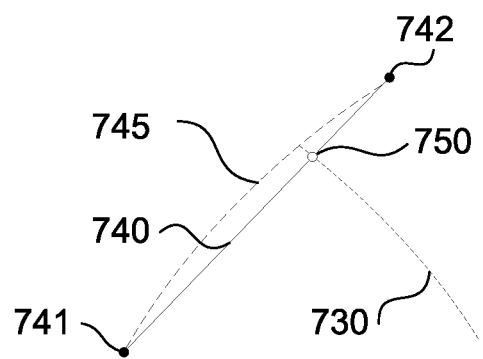

At decision step 550, the shading type 7 tessellation module 360, under execution of the processor 105, is used to determine whether the interior tessellation curve 730 intersects the segment 740. There are two cases as to whether or not the interior tessellation curve 730 intersects the segment 740, as shown in FIG. 7B and FIG. 7C, respectively. The shading type 7 tessellation module 360 determines whether or not the interior tessellation curve 730 intersects the segment 740 by calculating the roots of an expression formed by substituting x and y components of the interior tessellation curve 730 $R_{v=K\Delta k}(u)$ into the linear representation for the segment 740. Only roots within the range u∈[0,δl] (or u∈[1−δl,1]) are used at 750, with any other root being ignored. The selected roots indicate an intersection point within the boundary area segments.

If, at step 550, the interior tessellation curve 730 does not intersect the segment 740 of the vectorised boundary curve 710 as shown in FIG. 7B, then the method 500 proceeds to adding step 570. Otherwise, the method 500 proceeds to adding step 560.

As described in detail below, at either of steps 560 and 570, the shading type 7 tessellation module 360 is used for determining a colour split point on the vectorised boundary curve (e.g., 710), the colour split point being determined based on the vectorised boundary curve and on the interior tessellation curve 730 determined at step 540. As also described below, the colour split point is associated with a point of intersection of the vectorised boundary curve 710 and the interior tessellation curve 730 associated with a parametric value.

At step 570, the point 750 closest to an endpoint 735 of the interior tessellation curve 730, lying on the segment 740, is determined under execution of the processor 105 by determining an orthogonal projection point 750 representing an orthogonal projection of the endpoint 735 on a line which contains the segment 740. If the orthogonal projection point 750 belongs to the segment 740 then the orthogonal projection point 750 is determined to be a colour split point and is added to the array $A_{split}$ of colour split points configured within the memory 106. The processor 105 is used at step 570 for projecting the endpoint 735 of the determined interior tessellation curve 730 associated with a parametric value onto the segment 740 of the vectorised boundary curve to determine the colour split point.

Otherwise, closest endpoint 741 or 742 of the segment 740 is determined to be a colour split point and is added to the array of colour split points configured within the memory 106. The closest endpoint 741 or 742 is selected as a fallback method and in such case the colour split point added to the array $A_{split}$ has no real effect since the colour split point is the same as an existing point from the interior tessellation curve 730. However, a colour split point is still added to the array $A_{split}$ at step 570 to ensure that every inside tessellation point has a corresponding colour split point in the array $A_{split}$ with the same parametric value. The original boundary curve 745 is shown in FIG. 7B to clarify the geometry.

If, at step 550, the interior tessellation curve 730 does intersect the segment 740 of the vectorised boundary curve 710 as shown in FIG. 7C, then the method 500 proceeds to step 560. At step 560, intersection point 750 of the interior tessellation curve 730 with the segment 740 is determined to be a colour split point and is added to the array $A_{split}$ of colour split points configured within the memory 106. Again, the original boundary curve 745 is shown in FIG. 740 to clarify the geometry.

At adding step 580, depending on the representation of the colour blend in the PDF type 7 shading data structure, either a colour value or a parameteric value is added to the array $A_{split}$ of colour split points associated with the colour split point 750. The colour of the colour split point 750 is determined by interpolating parametric values of the vectorised boundary curve 710 based on a position of the colour split point 750 on the vectorised boundary curve 710. In the example of FIG. 7A to 7D, the colour of the colour split point 750 is determined using linear interpolation between the colour value or parameter value at the end points 741, 742 along the boundary segment 740 joining the end points 741, 742. Associating a colour or parameteric value with the colour split point 750 at step 580 avoids colour artefacts around a boundary curve shared by two (2) adjacent parametric patches by ensuring that the colours along the boundary curve are the same for both adjacent parametric patches. Since linear interpolation is used, the colour or parametric value associated with the colour split point 750 is determined using the position of the colour split point 750 on the vectorised boundary curve relative to the end points 741, 742 of the boundary segment 740 and colour or parametric values at the end points 741, 742 of the boundary segment 740. Given a distance between the colour split point 750 and end points 741 and 742 to be p1 and p2 respectively, the colour or parametric values of the colour split point 750 can be calculated by means of linearly interpolation using p1 and p2 and their associated colour or parametric values.

Following step 580, the method 500 proceeds to step 590 where the variable K and the method 500 returns to step 530.

Once steps 530, 540, 560, 570, 580 and 590 have been performed for all of the possible values of K previously determined at step 520 for each boundary curve of the parametric patch 610 being processed, then the method 500 proceeds to forming step 535.

Figure 8:
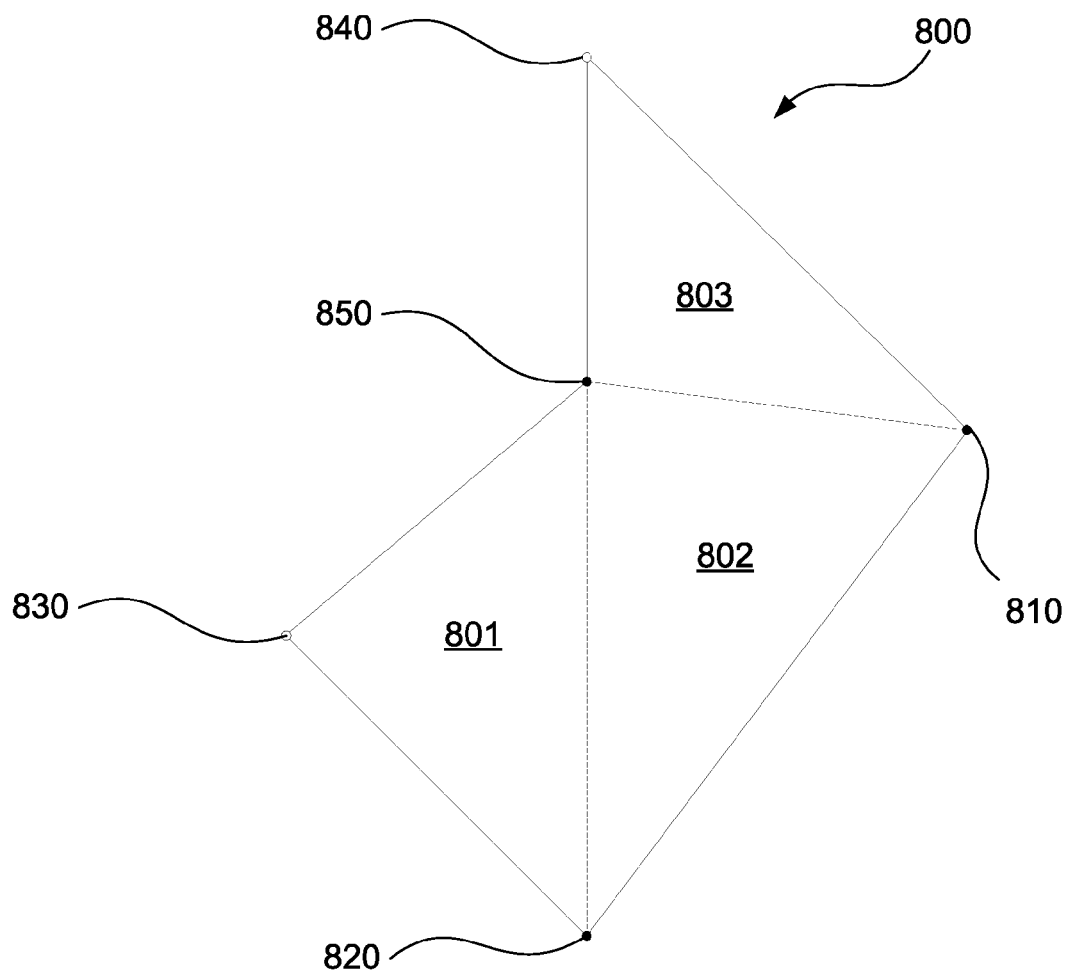
FIG. 8 shows an example of a polygon from a boundary region of a parametric patch split into triangles.

At forming step 535, polygonal cells are formed for inside tessellation points of the area 623 adjacent to the boundary of the parametric patch 610, using three (3) point colour blend structures. The polygonal cells formed at step 535 may be stored in the memory 106. Each polygonal cell formed at step 535 comprises two neighbouring inside tessellation points as determined at step 430 of the method 400. Each of the polygonal cells are formed by joining a colour split point determined in steps 560 or 570 to corresponding tessellation points. For example, FIG. 8 shows a polygon cell 800 comprises two neighbouring inside tessellation points 810, 820, corresponding colour split points 830, 840, and any intermediate boundary curve points 850. The colour split point corresponding to an inside tessellation point is the colour split point determined at either of steps 560 and 570 for the interior tessellation curve (e.g., 730) passing through the colour split point. The polygonal cells are then output using three (3) point blends and polygon triangulation methods, thereby tessellating the parametric patch 610 being processed.

Referring again to FIG. 8, as described above each polygonal cell determined at step 535 comprises two neighbouring inside tessellation points 810, 820, corresponding colour split points 830, 840, and any intermediate boundary curve points 850. The colour split point corresponding to an inside tessellation point is the colour split point determined at steps 560 or 570 for the interior tessellation curve passing through the colour split point. Resulting polygons may be split into triangles using any suitable polygon triangulation methods to form the polygonal cells.

Also at step 535, the triangles determined at step 535 as described above are output to the shading module 350, over interface 317, as three point colour blend structures. If parameter values are used in place of a colour, the triangles may be further sub-divided at step 535 and 545 (see below) in order to smoothly represent a final colour. The use of colour split points in accordance with the method 400 avoids the colour artefacts that may otherwise occur around the boundary curves of the parametric patch being tessellated.

Figure 9:
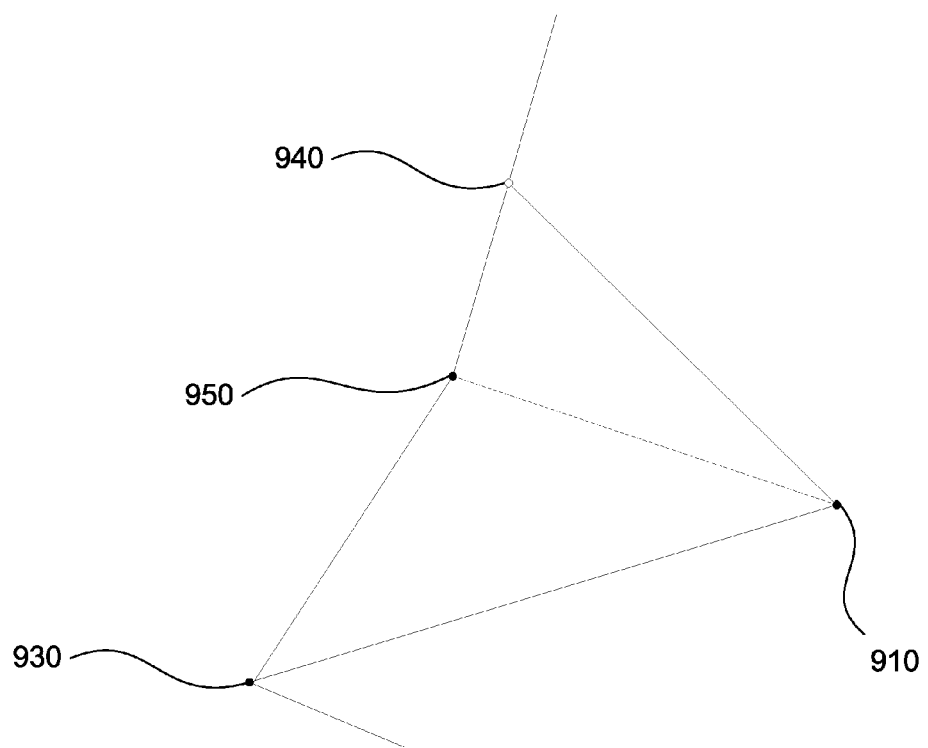
FIG. 9 is a diagram detailing the treatment of a corner point.

The method 500 concludes at forming step 545, where polygonal cells are formed for corner points of the area 623, using three (3) point colour blend structures. As an example, corners of an interior array, such as interior array 910 as seen in FIG. 9, are joined to corners of the boundary curves (e.g., boundary curve 930), to create a polygon. The created polygon comprises interior array corner point 910 (i.e. (δu, δv), (δu, 1−δv), (1−δu, δv), or (1−δu, 1−δv)), boundary corner point 930 (correspondingly (0,0), (0,1), (1,0), or (1,1)), the colour split point 940 associated with the interior array corner point, and any intermediate boundary points 950 between the corner point 930 and the colour split point 940 that were part of the original vectorisation of the boundary curve. The corners of interior arrays are joined at step 545 for each of the boundary curves of the parametric patch 610 that meet at the corner, yielding two (2) such polygons per corner. The resulting polygons may be split into triangles at step 545 using any suitable triangulation method. Also at step 545, the resulting triangles are output to the shading unit 350 over interface 317, as three point colour blend structures.

Figure 10:
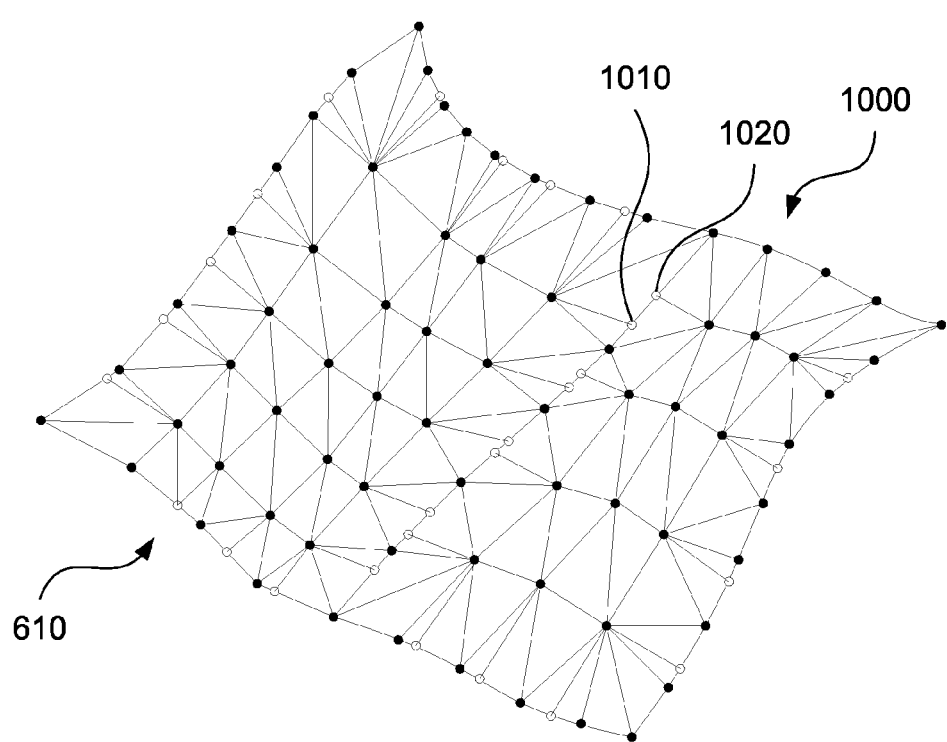
FIG. 10 is a diagram showing two adjacent Bézier patches after the tessellation method of FIG. 4 has been executed on the patches.

FIG. 7D shows the parametric patch 610 following tessellation in accordance with the method 400. FIG. 10 shows the tessellated parametric patch 610 together with a neighbouring parametric patch which has been tessellated in accordance with the method 400. The tessellated parametric patch 610 matches neighbouring parametric patches in terms of the position of vectorised boundary edges because corresponding colour split points (e.g., 1010, 1020) are determined to lie on the vectorised boundary. The colour split points (e.g. 1010, 1020) for the neighbouring patches 610 and 1000 do not correspond across the boundary edge, but this does not introduce a crack because the boundary edges are all determined to lie on the initial vectorised segments. The colours match across the boundary edge because the colours of the split points are determined by linear interpolation between vertices of the vectorised boundary. Triangularisation (i.e., tessellation) can therefore be performed without reference to neighbouring parametric patches. The triangularisation can also be performed in its own thread without inter-thread interactions to share information about modifications each thread may be making to the boundary. In the case where the interior tessellation produces more colour split points than the number of boundary points produced by initial vectorisation, the combined set of points allows the interior of a boundary region to be tessellated to within the flatness tolerance (i.e., as described above) of both adjacent parametric patches. The tessellation method described above may be performed independently and in parallel for the patches of a mesh.

Figure 11A:
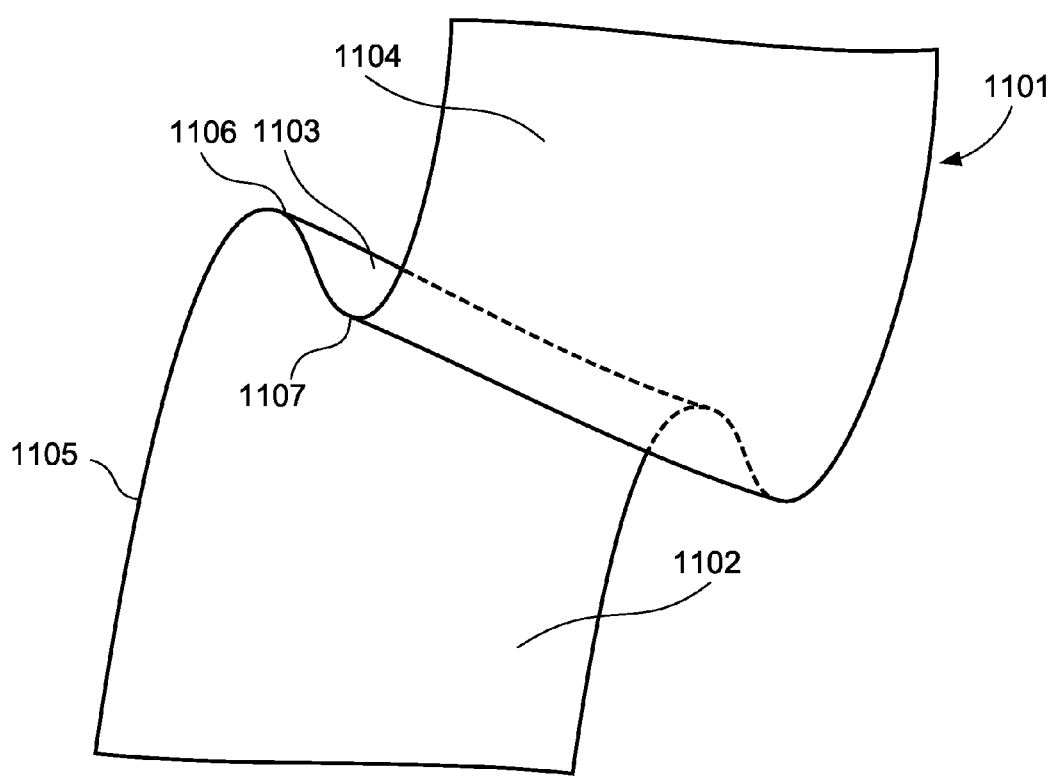
FIG. 11A is a diagram showing an example Bézier patch with front-facing and back-facing regions.

In an alternative arrangement, step 480 additionally includes calculating a tessellation point on a boundary curve of the patch corresponding to a turning point of the patch. FIG. 11A shows an example patch 1101 which includes front-facing areas 1102 and 1104, and a back-facing area 1103, which may be referred to as a "foldover condition". Certain configurations of the control points that define the geometry of the patch 1101 give rise to the foldover condition. For a given boundary curve of a patch, some sections of the boundary curve have an immediately adjacent patch region that is forward-facing, and some sections of the boundary curve have an immediately adjacent patch region that is back-facing. A transition point between sections adjacent to forward-facing and back-facing patch regions is termed a "turning point" for that boundary curve of the patch. For the example patch 1101, boundary curve 1105 has a first turning point 1106 marking a transition between adjacent forward-facing region 1102 and adjacent back-facing region 1103, and a second turning point 1107 marking a transition between adjacent back-facing region 1103 and forward-facing region 1104.

Figure 12A:
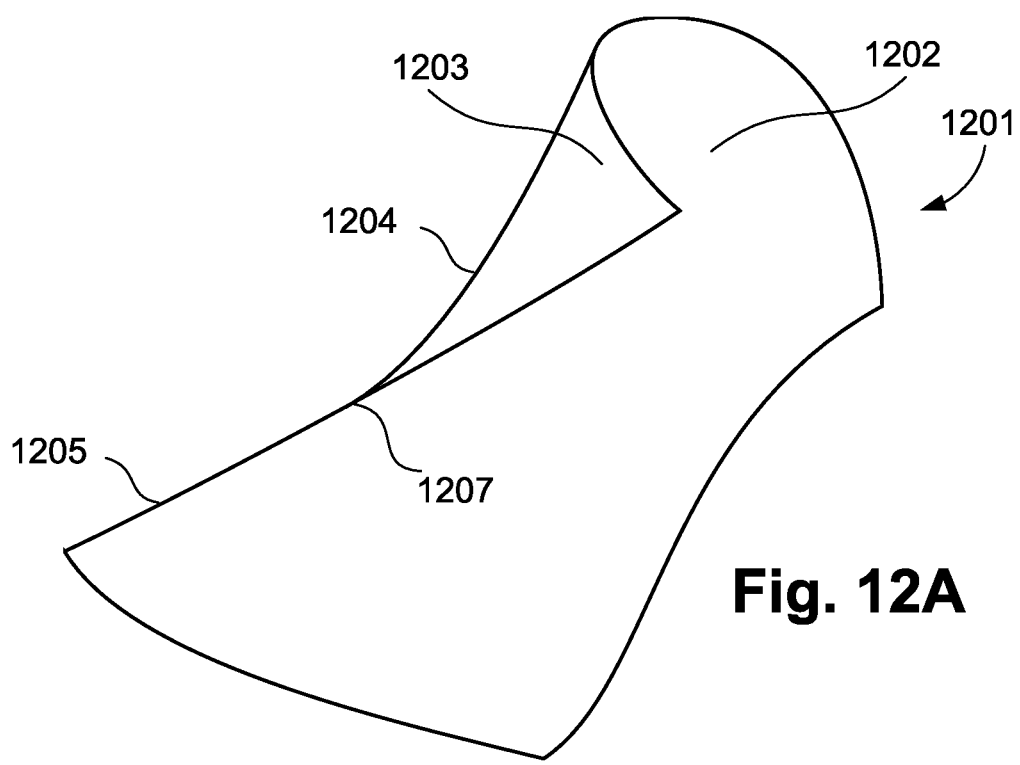
FIG. 12A is a diagram showing a further example Bezier patch with front-facing and back-facing regions.

FIG. 12A shows an example patch 1201 with a particular configuration of controls points such that the edges produce a foldover effect, yielding front-facing region 1202 and back-facing region 1203. Patch boundary curve 1205 is a straight line, or only slightly curved, and hence yields relatively few vectorisation segments. A turning point 1207 located on boundary curve 1205 marks the transition, with respect to boundary curve 1205, of adjacent front-facing region 1202 and back-facing region 1203. Line 1204 is not a defined boundary curve of the patch 1201, but is a line representing the silhouette of the patch 1201 in the region of the foldover effect.

Figure 12B:
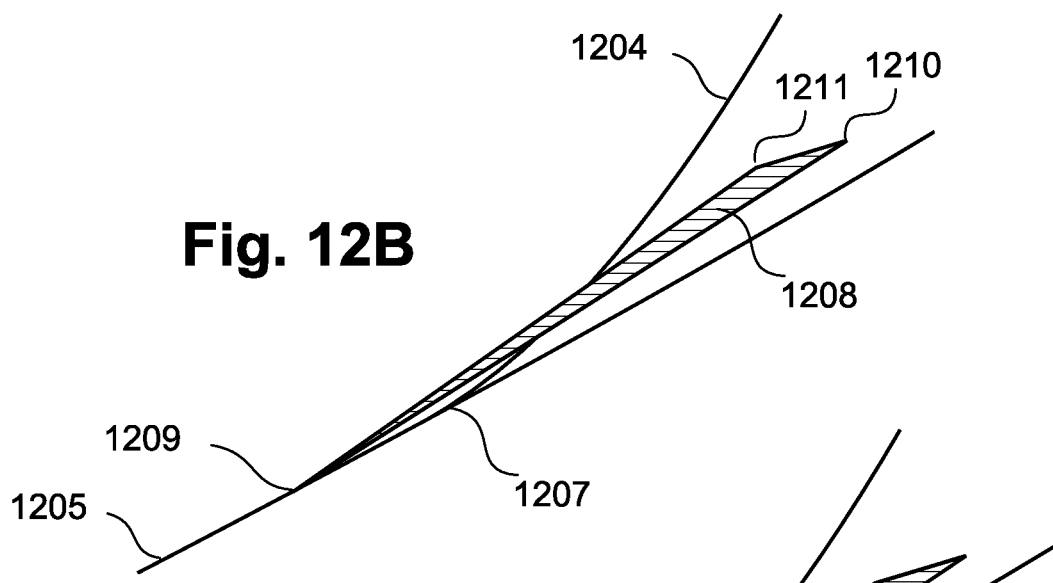
FIG. 12B shows a magnified view of the patch of FIG. 12A in the vicinity of a turning point, showing a triangle of a tessellation spanning front-facing and back-facing regions adjacent to a patch boundary curve.
Figure 12C:
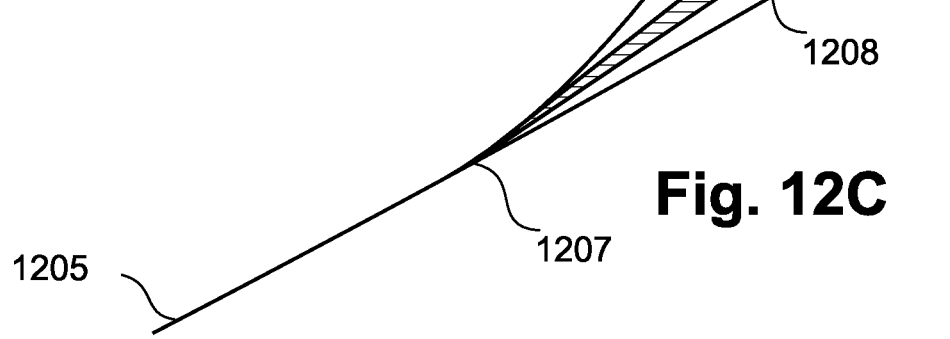
FIG. 12C shows the magnified view of FIG. 12B, with a triangle of the tessellation formed by joining interior tessellation points with a geometrical split point.

FIG. 12B shows a magnified view of the example patch 1201 in the region of turning point 1207. The patch boundary curve 1205, being straight or only slightly curved, offers very few tessellation points arising from vectorisation points being the endpoints of the straight line segments that approximate the boundary curve 1205. A tessellation triangle 1208 joins interior tessellation points 1210 and 1211 to the nearest boundary tessellation point 1209. However, the triangle 1208 spans vertices on or adjacent to a front-facing region with vertices on or adjacent to a back-facing region. In the example of FIGS. 12A, 12B and 12C, a large triangle is drawn that extends outside the patch area bounded by the silhouette curve 1204, resulting in a visible rendering artefact.

With reference to the set of points for each boundary curve of the patch calculated at step 460 and corresponding to the tessellation step size for patch boundary curve (in turn calculated at step 450), if triangles were formed by simply joining points of the vectorised boundary curves and the closest interior points (either in xy space or in uv parametric space) the resulting tessellation may include triangles spanning both front-facing and back-facing regions of the patch. There may be one or more vertices located within a front-facing region of the patch, and one or more vertices located within a back-facing region of the patch, which has the effect of introducing a non-smooth visual artefact. The non-smooth visual artefact appears within the rendered patch as produced by drawing three-point blended triangles according to the tessellation of the patch. Therefore, for each turning point (fold over point) on a boundary curve of the patch, an additional split point is introduced to the set of tessellation points for that boundary curve. The additional split point, by way of analogy to the color split points (e.g. color split point 750), may be termed a geometrical split point. By introducing geometrical split points, at step 480 in which a tessellation of the patch adjacent to the boundary curve is produced, triangles that would otherwise span forward-facing and back-facing regions of the patch are not formed, and instead the tessellation includes triangles that meet at the geometrical split point. That is, the tessellation shall include triangles that include only points within a forward-facing region of the patch, plus the geometrical split point itself, or, include only points within a back-racing region of the patch, plus the geometrical split point itself.

Figure 11B:
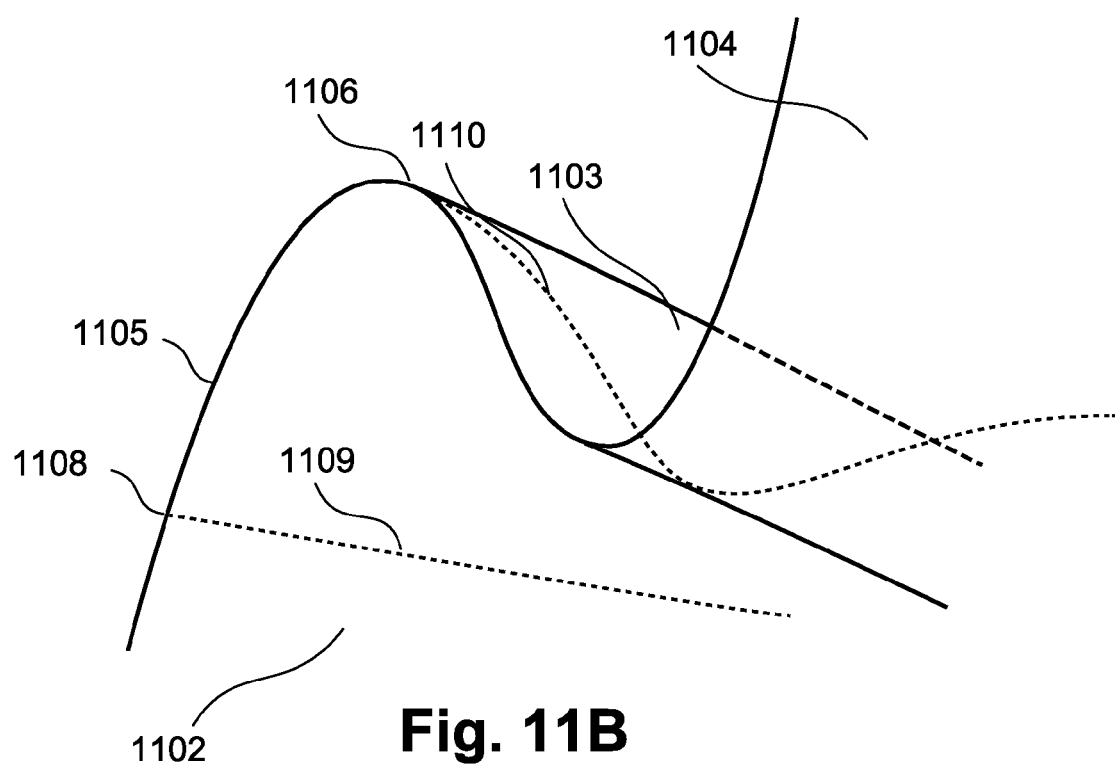
FIG. 11B shows a magnified view of the patch of FIG. 11A in the vicinity of a back-facing region, and showing the intersection of internal tessellation curves with the patch boundary.

FIG. 11B shows a magnified portion of patch 1101 in the vicinity of back-facing region 1103. Boundary curve 1105 is the locus of points with u=0 within parametric uv-space. Isoline 1109 is the locus of points for which v is equal to some constant value v1, and for which u varies. Isoline 1110 is the locus of points for which v is equal to some constant value v2, and for which u varies. In the example patch 1101, at the boundary point 1108 at which isoline 1109 intersects the boundary curve 1105, the isoline 1109 is not tangential to the boundary curve 1108, in xy space. However, at the turning point 1106, which is the point at which isoline 1110 intersects the boundary curve 1105, isoline 1110 is tangential to boundary curve 1105, in xy space.

Turning points for a boundary curve of the patch (e.g., boundary curve 1105) are determined by locating points on each boundary curve for which lines of constant u or v (isolines), heading into the parametric space of the patch bounded by the unit square, are tangential to that boundary curve itself. For example, for a generalised point (0, a) in uv parametric space located on the boundary curve for which u=0, a vector $V_{boundary}(x,y)$ representing the direction of the boundary curve in xy space can be expressed in accordance with Equation (10), as follows:

$$V_{boundary}(x, y) = \left( \frac{\partial x}{\partial v_{(0,a)}}, \frac{\partial y}{\partial v_{(0,a)}} \right) \quad (10)$$

and, a vector $V_{internal}(x, y)$ representing the direction of an isoline (with v=a) intersecting the boundary curve at a point (0, a) in uv parametric space and heading into the parametric space of the patch can be expressed in accordance with Equation (11), as follows:

$$V_{internal}(x, y) = \left( \frac{\partial x}{\partial u_{(0,a)}}, \frac{\partial y}{\partial u_{(0,a)}} \right) \quad (11)$$

where the parametric point (0, a) is supplied as the input to the expressions x(u, v) and y(u, v) for mapping points in parametric uv space to points in xy space according to the Bernstein polynomials, as previously described above in Equation (9). It should be noted that, in parametric uv space, the internal isoline (with v=a) is perpendicular to the boundary curve for which u=0, i.e. $V_{internal}(x, y)$ is perpendicular to $V_{boundary}(x, y)$.

For the boundary curve for which u=1, Equations (10) and (11) are modified by using the generalised point (1, a). For the boundary curves for which v=0 or v=1, Equations (10) and (11) are modified by using the generalised points (b, 0) and (b, 1) respectively.

Having obtained vectors for the direction of the boundary curve and the direction of the internal isoline at a point on the boundary curve, the point can be tested for being a turning point of the patch. The point can be tested by evaluating Equation (12), below, corresponding to the magnitude of the cross product of the vectors, as follows (for a point (0,a) on the boundary with u=0):

$$N(u, v) = \frac{\partial x}{\partial v_{(0,a)}} \cdot \frac{\partial y}{\partial u_{(0,a)}} - \frac{\partial y}{\partial v_{(0,a)}} \cdot \frac{\partial x}{\partial u_{(0,a)}} \quad (13)$$

where the value N(u, v)=0 when the parametric point (u, v) is a turning point. In one arrangement, values of variable a that define points for which Equation (13) evaluates to zero by sampling points (0,a) for which a varies within the range [0,1] at some pre-selected granularity. Alternatively, values of a which yield zeroes of Equation (13) may be located via recursive subdivision and evaluation of the solution domain, from which a value of a that is a solution to Equation (13) may be identified. The solution domain is progressively divided into smaller and smaller solution domains until an evaluation of Equation (13) yields a solution within some accepted numerical tolerance. Alternatively, values of a for which an evaluation of Equation (13) results in zero can be located by solving Equation (13) numerically using methods such as Newton's method for finding zeroes of real-valued functions. Having yielded values of a, giving rise to points of the form (0,a) in parametric uv space as turning points of the patch, the values of a can be mapped to points in xy space according to the patch geometry. Turning points for the other boundary curves of the patch (i.e., the boundary with u=1, the boundary with v=0 and the boundary with v=1) are located according to analogous methods and equations. The process of locating turning points on patch boundary curves is performed purely with respect to the patch parameters that define geometry of the patch.

Having obtained turning points for boundary curves of the patch, each turning point is mapped to a location on one of the straight-line segments comprising the vectorised boundary curve. Each turning point in turn becomes a geometrical split point that shall be utilised in the process of forming a tessellation of the patch surface in the region adjacent to the boundary curve. The mapping process for each turning point is analogous to previously described steps 540, 550, 560 and 570 for mapping color split points to the vectorised boundary curve. The mapping process for each turning point shall now be explained with reference to steps 540, 550, 560 and 570, except that the calculated result is added as a geometrical split point instead of being added to an array of color split points.

To map a turning point to a location on one of the straight-line segments comprising the vectorised boundary curve, an interior tessellation curve is selected as at step 540. The interior tessellation curve is the isoline of constant u or v parametric value that intersects the boundary curve at the turning point. The particular segment of the vectorised boundary curve that contains the parametric value of the turning point is identified. Then, as at step 550, it is determined if the interior tessellation curve intersects the vectorised boundary segment for some parametric value in the range [0,1], as shown in FIG. 7C. If the interior tessellation curve does intersect the vectorised boundary segment, then the turning point is mapped to the xy location at which the interior tessellation curve intersects the boundary segment as at step 560. Otherwise, as at step 570, a point on the boundary segment that is closest to the endpoint of the interior tessellation curve is selected as the location for the geometrical split point.

FIG. 12C shows the result of including, amongst the tessellation nodes for the patch 1201, the geometrical split point formed by mapping the turning point 1207 to the vectorised patch boundary 1205. The tessellation triangle 1208 formed by joining interior tessellation points of the patch 1201 to a tessellation point on the vectorised patch boundary 1205 of the patch 1201 (being a geometrical split point) does not span front-facing and rear-facing regions adjacent to the patch boundary 1205, and therefore does not exhibit the rendering artefact shown in FIG. 12B. For clarity, FIGS. 12B and 12C do not separately show the vectorisation of the patch boundary 1205. In the example of FIG. 12C, the patch boundary 1205 is straight or only slightly curved, and the vectorised boundary is sufficiently close to the patch boundary 1205 as to not warrant a separate depiction.

The described arrangement of adding geometrical split points to the vectorised boundary curve for patches may be carried out in combination with the described arrangement of adding color split points to the vectorised boundary curves. In such a combination, the tessellation is formed as shown in FIG. 7D, in the manner previously described, with the exception that tessellation nodes at the boundary of a patch may be contributed by the vectorisation of the patch boundary, colour split points, or geometrical split points. Alternatively, an arrangement which uses geometrical split points but does not utilise color split points is also possible. The described arrangements preserve the crack-free property of the resulting tessellation when adjoining patches are tessellated, as was previously described with reference to FIG. 7D.

In an alternative arrangement, patches from a mesh may be rendered in parallel, for example, using a graphics processing unit (GPU) or multi-core CPU instead of and/or together with the processor 105. In such a GPU or multi-core CPU arrangement, the shading type 7 tessellation module 360 creates multiple threads of execution, one thread of execution for each shading patch. Each thread of execution executes the method 400 and method 500 for the particular parametric patch that each thread needs to render. The threads of execution may be executed independently of each other and in parallel, and return three (3) point blends to the calling module (e.g., the shading unit 350). The calling module manages the reception of the three (3) point blends from the various threads of execution.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A computer-implemented method of tessellating a parametric patch of an object to be rendered, said method comprising:
   vectorising a boundary curve associated with the parametric patch according to a pre-determined flatness tolerance;
   determining, using a processor, a tessellation point inside the parametric patch based on geometry of the parametric patch and a tessellation step;
   determining, using the processor, an interior curve associated with the determined tessellation point based on the geometry of the parametric patch and the tessellation step;
   determining, using the processor, a colour split point on the vectorised boundary curve, the colour split point being determined based on the vectorised boundary curve and the determined interior curve; and
   tessellating, using the processor, the parametric patch by joining the colour split point and the tessellation point, wherein tessellation data corresponding to the parametric patch is stored in a processor-accessible memory to enable rendering of the object.

2. The method according to claim 1, wherein the colour split point is associated with a point of intersection of the vectorised boundary curve and the determined interior curve associated with a first parametric value.

3. The method according to claim 1, further comprising projecting an endpoint of the determined interior curve associated with a first parametric value onto the vectorised boundary curve to determine the colour split point.

4. The method according to claim 1, further comprising interpolating parametric values of the vectorised boundary curve based on a position of the colour split point on the vectorised boundary curve to determine a colour of the colour split point.

5. The method according to claim 1, wherein the boundary curve partially defines the patch.

6. The method according to claim 1, wherein vectorisation of the boundary curve is based on a curvature of the boundary curve.

7. The method according to claim 1, wherein the tessellation step is fixed.

8. The method according to claim 1, further comprising determining the tessellation point based on a pre-determined flatness tolerance.

9. The method according to claim 1, further comprising:
   identifying a point on the boundary curve where at least one internal curve of the parametric patch is tangential to the boundary curve, the at least one internal curve being determined using the geometry of the parametric patch;
   determining a geometrical split point on the vectorised boundary curve by projecting the identified point onto the vectorised boundary curve; and
   tessellating the parametric patch by joining the geometrical split point and at least one said tessellation point.

10. The method according to claim 1, further comprising:
    identifying a point on the boundary curve where at least one internal curve of the parametric patch is tangential to the boundary curve, the at least one internal curve being determined using the geometry of the parametric patch;
    determining a geometrical split point on the vectorised boundary curve by projecting the identified point onto the vectorised boundary curve; and
    tessellating the parametric patch by joining the geometrical split point and at least one said tessellation point, and joining the geometrical split point and the colour split point.

11. The method according to claim 1, further comprising:
    identifying a point on the boundary curve where at least one internal curve of the parametric patch is tangential to the boundary curve, the at least one internal curve being determined using the geometry of the parametric patch;
    determining a geometrical split point on the vectorised boundary curve by projecting the identified point onto the vectorised boundary curve; and
    tessellating the parametric patch by joining the geometrical split point and at least one said tessellation point, wherein the internal curve is perpendicular to the boundary curve in uv parametric space.

12. The method according to claim 1, further comprising:
    identifying a fold over point on the boundary curve describing a transition between front facing surface and back facing surface of the parametric patch using partial derivatives of the boundary curve and partial derivatives of a plurality of internal curves of the parametric patch determined based the geometry of the parametric patch;

determining a geometrical split point on the vectorised boundary curve using the identified fold over point; and tessellating the parametric patch by joining the geometrical split point and at least one said tessellation point.

13. The method according to claim 1, further comprising:
identifying a fold over point on the boundary curve describing a transition between front facing surface and back facing surface of the parametric patch based on the geometry of the parametric patch;

determining a geometrical split point on the vectorised boundary curve using the identified fold over point; and tessellating the parametric patch by joining the geometrical split point and at least one said tessellation point.

14. The method according to claim 1, wherein the parametric patch is being tessellated in parallel with tessellating a further parametric patch of the to be rendered object.

15. A computer system for tessellating a parametric patch of an object to be rendered, said system comprising:
a memory for storing data and a computer program;
a processor coupled to the memory for executing the computer program, the computer program comprising instructions for;
vectorising a boundary curve associated with the parametric patch according to a pre-determined flatness tolerance;
determining, using the processor, a tessellation point inside the parametric patch based on geometry of the parametric patch and a tessellation step;
determining, using the processor, an interior curve associated with the determined tessellation point based on the geometry of the parametric patch and the tessellation step;
determining, using the processor, a colour split point on the vectorised boundary curve, the colour split point being determined based on the vectorised boundary curve and the determined interior curve; and
tessellating, using the processor, the parametric patch by joining the colour split point and the tessellation point, wherein tessellation data corresponding to the parametric patch is stored in the memory to enable rendering of the object.

16. A non-transitory computer readable storage medium having a computer program stored thereon for tessellating a parametric patch of an object to be rendered, said program comprising:
code for vectorising a boundary curve associated with the parametric patch according to a pre-determined flatness tolerance;

code for determining a tessellation point inside the parametric patch based on geometry of the parametric patch and a tessellation step;

code for determining an interior curve associated with the determined tessellation point based on the geometry of the parametric patch and the tessellation step;

code for determining a colour split point on the vectorised boundary curve, the colour split point being determined based on the vectorised boundary curve and the determined interior curve; and code for tessellating the parametric patch by joining the colour split point and the tessellation point, wherein tessellation data corresponding to the parametric patch is stored in a processor-accessible memory to enable rendering of the object.

17. A method of tessellating a parametric patch of an object to be rendered, said method comprising:
vectorising a boundary curve associated with the parametric patch according to a pre-determined flatness tolerance;
determining, using a processor, a plurality of tessellation points inside the parametric patch using a tessellation step, the tessellation step being based on geometry of the parametric patch;
identifying, using the processor, a fold over point on the boundary curve where at least one internal curve of the parametric patch is tangential to the boundary curve, the at least one internal curve being determined using the geometry of the parametric patch;
determining, using the processor, a geometrical split point on the vectorised boundary curve by projecting the identified fold over point onto the vectorised boundary curve; and
tessellating, using the processor, the parametric patch by joining the geometrical split point and at least one said tessellation points, wherein tessellation data corresponding to the parametric patch is stored in a processor-accessible memory to enable rendering of the object.

18. The method according to claim 17, wherein internal curves being perpendicular to the boundary curve in uv parametric space.

19. The method according to claim 17, wherein identifying a fold over point on the boundary curve is based on partial derivatives of the boundary curve and partial derivatives of internal structure of the parametric patch determined based the geometry of the parametric patch.

* * * * *